(12) United States Patent
Louie et al.

(10) Patent No.: US 11,132,744 B2
(45) Date of Patent: *Sep. 28, 2021

(54) SYSTEMS AND METHODS TO PROVIDE ACCOUNT FEATURES VIA WEB BASED USER INTERFACES

(71) Applicant: Visa International Service Association, San Francisco, CA (US)

(72) Inventors: Anne Marie Louie, San Carlos, CA (US); Shipra Jha, Fremont, CA (US)

(73) Assignee: Visa International Service Association, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/427,778

(22) Filed: May 31, 2019

(65) Prior Publication Data
US 2019/0287170 A1 Sep. 19, 2019

Related U.S. Application Data

(63) Continuation of application No. 14/106,380, filed on Dec. 13, 2013, now Pat. No. 10,360,627.

(60) Provisional application No. 61/736,986, filed on Dec. 13, 2012.

(51) Int. Cl.
G06Q 40/02 (2012.01)
(52) U.S. Cl.
CPC .................... *G06Q 40/02* (2013.01)
(58) Field of Classification Search
USPC .......................................................... 705/35
See application file for complete search history.

(56) References Cited

U.S. PATENT DOCUMENTS

| 5,401,946 A | 3/1995 | Weinblatt |
| RE34,915 E | 4/1995 | Nichtberger et al. |
| 5,465,206 A | 11/1995 | Hilt et al. |
| 5,592,560 A | 1/1997 | Deaton et al. |

(Continued)

FOREIGN PATENT DOCUMENTS

| JP | 2000357204 A | 12/2000 |
| JP | 200184239 A | 3/2001 |

(Continued)

OTHER PUBLICATIONS

Ahn et al., "Standard Errors of Mean, Variance, and Standard Deviation Estimators", EECS Department, The University of Michigan, Jul. 24, 2003, pp. 1-2. Available at: http://www.eecs.umich.edu/~fessler/papers/files/tr/stderr.pdf.

(Continued)

*Primary Examiner* — Hani M Kazimi
*Assistant Examiner* — Hatem M Ali
(74) *Attorney, Agent, or Firm* — The Webb Law Firm

(57) ABSTRACT

A portal to provide user interfaces to users to access and/or purchase account features in connection with websites of issuers. The user interfaces have white label configurability that allows the issuers to customize the labeling of the user interfaces such that the user interfaces can be perceived as part of the websites of the issuers of the consumer accounts of the respective users. The user interfaces are configured to present, in a user friendly way, the account features currently in the consumer accounts, as well as optional account features that can be purchased at additional costs.

15 Claims, 27 Drawing Sheets

(56) References Cited

U.S. PATENT DOCUMENTS

| | | |
|---|---|---|
| 5,621,812 A | 4/1997 | Deaton et al. |
| 5,638,457 A | 6/1997 | Deaton et al. |
| 5,684,990 A | 11/1997 | Boothby |
| 5,687,322 A | 11/1997 | Deaton et al. |
| 5,710,886 A | 1/1998 | Christensen et al. |
| 5,761,648 A | 6/1998 | Golden et al. |
| 5,791,991 A | 8/1998 | Small |
| 5,883,810 A | 3/1999 | Franklin et al. |
| 5,905,246 A | 5/1999 | Fajkowski |
| 5,924,080 A | 7/1999 | Johnson |
| 5,950,172 A | 9/1999 | Klingman |
| 5,953,710 A | 9/1999 | Fleming |
| 5,966,695 A | 10/1999 | Melchione et al. |
| 5,970,478 A | 10/1999 | Walker et al. |
| 5,974,396 A | 10/1999 | Anderson et al. |
| 6,009,411 A | 12/1999 | Kepecs |
| 6,012,038 A | 1/2000 | Powell |
| 6,032,133 A | 2/2000 | Hilt et al. |
| 6,035,280 A | 3/2000 | Christensen |
| 6,041,309 A | 3/2000 | Laor |
| 6,070,147 A | 5/2000 | Harms et al. |
| 6,076,069 A | 6/2000 | Laor |
| 6,119,101 A | 9/2000 | Peckover |
| 6,119,103 A | 9/2000 | Basch et al. |
| 6,216,129 B1 | 4/2001 | Eldering |
| 6,227,447 B1 | 5/2001 | Campisano |
| 6,230,185 B1 | 5/2001 | Salas et al. |
| 6,275,824 B1 | 8/2001 | O'Flaherty et al. |
| 6,282,522 B1 | 8/2001 | Davis et al. |
| 6,285,983 B1 | 9/2001 | Jenkins |
| 6,298,330 B1 | 10/2001 | Gardenswartz et al. |
| 6,307,958 B1 | 10/2001 | Deaton et al. |
| 6,321,201 B1 | 11/2001 | Dahl |
| 6,321,208 B1 | 11/2001 | Barnett et al. |
| 6,321,984 B1 | 11/2001 | McCall et al. |
| 6,324,524 B1 | 11/2001 | Lent et al. |
| 6,332,126 B1 | 12/2001 | Peirce et al. |
| 6,334,110 B1 | 12/2001 | Walter et al. |
| 6,336,098 B1 | 1/2002 | Fortenberry et al. |
| 6,336,099 B1 | 1/2002 | Barnett et al. |
| 6,341,724 B2 | 1/2002 | Campisano |
| 6,366,923 B1 | 4/2002 | Lenk et al. |
| 6,377,935 B1 | 4/2002 | Deaton et al. |
| 6,385,594 B1 | 5/2002 | Lebda et al. |
| 6,422,462 B1 | 7/2002 | Cohen |
| 6,430,539 B1 | 8/2002 | Lazarus et al. |
| 6,473,739 B1 | 10/2002 | Showghi et al. |
| 6,494,367 B1 | 12/2002 | Zacharias |
| 6,505,168 B1 | 1/2003 | Rothman et al. |
| 6,519,571 B1 | 2/2003 | Guheen et al. |
| 6,598,030 B1 | 7/2003 | Siegel et al. |
| 6,636,833 B1 | 10/2003 | Flitcroft et al. |
| 6,643,624 B2 | 11/2003 | Philippe et al. |
| 6,786,400 B1 | 9/2004 | Bucci |
| 6,839,682 B1 | 1/2005 | Blume et al. |
| 6,845,906 B2 | 1/2005 | Royer et al. |
| 6,856,992 B2 | 2/2005 | Britton et al. |
| 6,901,373 B1 | 5/2005 | Chasko |
| 6,901,406 B2 | 5/2005 | Nabe et al. |
| 6,922,686 B2 | 7/2005 | Okamoto et al. |
| 6,938,019 B1 | 8/2005 | Uzo |
| 6,938,022 B1 | 8/2005 | Singhal |
| 6,941,376 B2 | 9/2005 | Mitchell et al. |
| 6,985,879 B2 | 1/2006 | Walker et al. |
| 6,996,560 B1 | 2/2006 | Choi et al. |
| 7,003,476 B1 | 2/2006 | Samra et al. |
| 7,024,374 B1 | 4/2006 | Day et al. |
| 7,024,409 B2 | 4/2006 | Iyengar |
| 7,035,855 B1 | 4/2006 | Kilger et al. |
| 7,039,599 B2 | 5/2006 | Merriman et al. |
| 7,047,041 B2 | 5/2006 | Vanska et al. |
| 7,058,817 B1 | 6/2006 | Ellmore |
| 7,062,510 B1 | 6/2006 | Eldering |
| 7,069,197 B1 | 6/2006 | Saidane |
| 7,072,847 B2 | 7/2006 | Ulenas et al. |
| 7,099,850 B1 | 8/2006 | Mann, II et al. |
| 7,103,576 B2 | 9/2006 | Mann, III et al. |
| 7,107,249 B2 | 9/2006 | Dively et al. |
| 7,117,172 B1 | 10/2006 | Black |
| 7,120,590 B1 | 10/2006 | Eisen et al. |
| 7,120,672 B1 | 10/2006 | Szeto et al. |
| 7,136,829 B2 | 11/2006 | Hellal et al. |
| 7,136,835 B1 | 11/2006 | Flitcroft et al. |
| 7,158,943 B2 | 1/2007 | van der Riet |
| 7,158,955 B2 | 1/2007 | Diveley et al. |
| 7,162,443 B2 | 1/2007 | Shah |
| 7,165,037 B2 | 1/2007 | Lazarus et al. |
| 7,177,822 B2 | 2/2007 | Mahmood et al. |
| 7,181,412 B1 | 2/2007 | Fulgoni et al. |
| 7,194,422 B1 | 3/2007 | St. John Killick |
| 7,225,142 B1 | 5/2007 | Apte et al. |
| 7,255,267 B2 | 8/2007 | Chao |
| 7,260,837 B2 | 8/2007 | Abraham et al. |
| 7,264,152 B2 | 9/2007 | Tsuei et al. |
| 7,269,578 B2 | 9/2007 | Sweeney |
| 7,280,975 B1 | 10/2007 | Donner |
| 7,299,194 B1 | 11/2007 | Manganaris et al. |
| 7,302,402 B2 | 11/2007 | Callaghan et al. |
| 7,318,049 B2 | 1/2008 | Iannacci |
| 7,319,986 B2 | 1/2008 | Praisner et al. |
| 7,324,965 B2 | 1/2008 | Martineau et al. |
| 7,328,169 B2 | 2/2008 | Temares et al. |
| 7,328,176 B2 | 2/2008 | Tarvydas et al. |
| 7,337,127 B1 | 2/2008 | Smith et al. |
| 7,340,438 B2 | 3/2008 | Nordman et al. |
| 7,356,490 B1 | 4/2008 | Jacobi et al. |
| 7,360,251 B2 | 4/2008 | Spalink et al. |
| 7,373,311 B2 | 5/2008 | Lambert et al. |
| 7,386,517 B1 | 6/2008 | Donner |
| 7,386,792 B1 | 6/2008 | Bascom et al. |
| 7,392,222 B1 | 6/2008 | Hamilton et al. |
| 7,398,252 B2 | 7/2008 | Neofytides et al. |
| 7,401,731 B1 | 7/2008 | Pletz et al. |
| 7,413,113 B1 | 8/2008 | Zhu |
| 7,415,424 B1 | 8/2008 | Donner |
| 7,424,439 B1 | 9/2008 | Fayyad et al. |
| 7,424,441 B2 | 9/2008 | George et al. |
| 7,444,297 B2 | 10/2008 | Shah |
| 7,444,658 B1 | 10/2008 | Matz et al. |
| 7,450,966 B2 | 11/2008 | Vanska et al. |
| 7,467,096 B2 | 12/2008 | Antonucci et al. |
| 7,467,106 B1 | 12/2008 | Levine et al. |
| 7,490,052 B2 | 2/2009 | Kilger et al. |
| 7,493,655 B2 | 2/2009 | Brown |
| 7,512,548 B1 | 3/2009 | Bezos et al. |
| 7,526,485 B2 | 4/2009 | Hagan et al. |
| 7,533,038 B2 | 5/2009 | Blume et al. |
| 7,536,360 B2 | 5/2009 | Stolfo et al. |
| 7,548,874 B2 | 6/2009 | Kanevsky et al. |
| 7,552,069 B2 | 6/2009 | Kepecs |
| 7,562,028 B1 | 7/2009 | Donner |
| 7,562,030 B1 | 7/2009 | Shapira et al. |
| 7,562,051 B1 | 7/2009 | Donner |
| 7,565,328 B1 | 7/2009 | Donner |
| 7,577,620 B1 | 8/2009 | Donner |
| 7,613,628 B2 | 11/2009 | Ariff et al. |
| 7,617,136 B1 | 11/2009 | Lessing et al. |
| 7,630,935 B2 | 12/2009 | Loeger et al. |
| 7,636,456 B2 | 12/2009 | Collins et al. |
| 7,665,657 B2 | 2/2010 | Huh |
| 7,720,782 B2 | 5/2010 | Chaudhury et al. |
| 7,729,977 B2 | 6/2010 | Xiao et al. |
| 7,740,171 B2 | 6/2010 | Kingsborough et al. |
| 7,752,107 B1 | 7/2010 | Bent et al. |
| 7,752,135 B2 | 7/2010 | Brown et al. |
| 7,761,406 B2 | 7/2010 | Harken |
| 7,796,162 B2 | 9/2010 | Ortiz |
| 7,827,115 B2 | 11/2010 | Weller et al. |
| 7,831,468 B1 | 11/2010 | Conte et al. |
| 7,908,183 B2 | 3/2011 | Jacobi et al. |
| 7,945,473 B2 | 5/2011 | Fano et al. |
| 8,229,855 B2 | 7/2012 | Huang et al. |
| 8,266,031 B2 | 9/2012 | Norris et al. |
| 8,346,661 B2 | 1/2013 | Allison, Jr. et al. |

(56) References Cited

U.S. PATENT DOCUMENTS

| | | | |
|---|---|---|---|
| 8,543,498 | B2 | 9/2013 | Silbernagel et al. |
| 8,672,742 | B2 | 3/2014 | Hedrick et al. |
| 9,471,926 | B2 | 10/2016 | Clyne |
| 9,572,614 | B2* | 2/2017 | Calvin ............... A61B 17/8833 |
| 9,754,314 | B2* | 9/2017 | Stone ................. G06Q 30/0621 |
| 9,767,212 | B2* | 9/2017 | Lavi .................... G06F 16/9577 |
| 2001/0001203 | A1 | 5/2001 | McCall et al. |
| 2001/0027413 | A1 | 10/2001 | Bhutta |
| 2001/0049620 | A1 | 12/2001 | Blasko |
| 2001/0056359 | A1 | 12/2001 | Abreu |
| 2001/0056368 | A1 | 12/2001 | Oguro |
| 2002/0004733 | A1 | 1/2002 | Addante |
| 2002/0026394 | A1 | 2/2002 | Savage et al. |
| 2002/0042738 | A1 | 4/2002 | Srinivasan et al. |
| 2002/0046187 | A1 | 4/2002 | Vargas et al. |
| 2002/0046341 | A1 | 4/2002 | Kazaks et al. |
| 2002/0053076 | A1 | 5/2002 | Landesmann |
| 2002/0059100 | A1 | 5/2002 | Shore |
| 2002/0062249 | A1 | 5/2002 | Iannacci |
| 2002/0065723 | A1 | 5/2002 | Anderson et al. |
| 2002/0069122 | A1 | 6/2002 | Yun et al. |
| 2002/0072952 | A1 | 6/2002 | Hamzy et al. |
| 2002/0099649 | A1 | 7/2002 | Lee et al. |
| 2002/0107861 | A1 | 8/2002 | Clendinning et al. |
| 2002/0123928 | A1 | 9/2002 | Eldering et al. |
| 2002/0138346 | A1 | 9/2002 | Kodaka et al. |
| 2002/0142841 | A1 | 10/2002 | Boushy |
| 2002/0152123 | A1 | 10/2002 | Giordano et al. |
| 2002/0156803 | A1 | 10/2002 | Maslov et al. |
| 2002/0174013 | A1 | 11/2002 | Freeman et al. |
| 2003/0004737 | A1 | 1/2003 | Conquest et al. |
| 2003/0018549 | A1 | 1/2003 | Fei et al. |
| 2003/0024988 | A1 | 2/2003 | Stanard |
| 2003/0028481 | A1 | 2/2003 | Flitcroft et al. |
| 2003/0047602 | A1 | 3/2003 | Iida et al. |
| 2003/0050854 | A1 | 3/2003 | Showghi et al. |
| 2003/0061132 | A1 | 3/2003 | Yu, Sr. et al. |
| 2003/0083933 | A1 | 5/2003 | McAlear |
| 2003/0101131 | A1 | 5/2003 | Warren et al. |
| 2003/0191832 | A1 | 10/2003 | Satyavolu et al. |
| 2003/0229585 | A1 | 12/2003 | Butler |
| 2004/0019518 | A1 | 1/2004 | Abraham et al. |
| 2004/0039686 | A1 | 2/2004 | Klebanoff |
| 2004/0049427 | A1 | 3/2004 | Tami et al. |
| 2004/0054581 | A1 | 3/2004 | Redford et al. |
| 2004/0054591 | A1 | 3/2004 | Spaeth et al. |
| 2004/0083183 | A1 | 4/2004 | Hardesty et al. |
| 2004/0083184 | A1 | 4/2004 | Tsuei et al. |
| 2004/0103037 | A1 | 5/2004 | Wetmore et al. |
| 2004/0122735 | A1 | 6/2004 | Meshkin |
| 2004/0133474 | A1 | 7/2004 | Tami et al. |
| 2004/0143527 | A1 | 7/2004 | Benkert et al. |
| 2004/0172309 | A1 | 9/2004 | Selwanes et al. |
| 2004/0193685 | A1 | 9/2004 | Proehl |
| 2004/0194128 | A1 | 9/2004 | McIntyre et al. |
| 2004/0225509 | A1 | 11/2004 | Andre |
| 2004/0225603 | A1 | 11/2004 | Allen et al. |
| 2004/0238622 | A1 | 12/2004 | Freiberg |
| 2004/0243468 | A1 | 12/2004 | Cohagan et al. |
| 2004/0254835 | A1 | 12/2004 | Thomas et al. |
| 2004/0267608 | A1 | 12/2004 | Mansfield, Jr. |
| 2005/0004839 | A1 | 1/2005 | Bakker et al. |
| 2005/0021401 | A1 | 1/2005 | Postrel |
| 2005/0021456 | A1 | 1/2005 | Steele et al. |
| 2005/0043992 | A1 | 2/2005 | Cohagan et al. |
| 2005/0055275 | A1 | 3/2005 | Newman et al. |
| 2005/0066240 | A1 | 3/2005 | Sykes et al. |
| 2005/0071225 | A1 | 3/2005 | Bortolin et al. |
| 2005/0071227 | A1 | 3/2005 | Hammad et al. |
| 2005/0097095 | A1* | 5/2005 | Halt, Jr. ................. G06F 16/957 |
| 2005/0124408 | A1 | 6/2005 | Vlazny et al. |
| 2005/0137949 | A1 | 6/2005 | Rittman et al. |
| 2005/0154664 | A1 | 7/2005 | Guy et al. |
| 2005/0159996 | A1 | 7/2005 | Lazarus et al. |
| 2005/0160002 | A1 | 7/2005 | Roetter et al. |
| 2005/0171898 | A1 | 8/2005 | Bishop et al. |
| 2005/0192862 | A1 | 9/2005 | Modi |
| 2005/0197923 | A1 | 9/2005 | Kilner et al. |
| 2005/0197954 | A1 | 9/2005 | Maitland et al. |
| 2005/0210022 | A1 | 9/2005 | Philippe et al. |
| 2005/0216823 | A1 | 9/2005 | Petersen et al. |
| 2005/0222929 | A1 | 10/2005 | Steier et al. |
| 2005/0228718 | A1 | 10/2005 | Austin |
| 2005/0261916 | A1 | 11/2005 | McCall et al. |
| 2006/0004655 | A1 | 1/2006 | Alexander, IV et al. |
| 2006/0053056 | A1 | 3/2006 | Alspach-Goss et al. |
| 2006/0064378 | A1 | 3/2006 | Clementz et al. |
| 2006/0080243 | A1 | 4/2006 | Kemper et al. |
| 2006/0091203 | A1 | 5/2006 | Bakker et al. |
| 2006/0122886 | A1 | 6/2006 | McKay |
| 2006/0143071 | A1 | 6/2006 | Hofmann |
| 2006/0143075 | A1 | 6/2006 | Carr et al. |
| 2006/0155603 | A1 | 7/2006 | Abendroth et al. |
| 2006/0161527 | A1 | 7/2006 | Dwork et al. |
| 2006/0167818 | A1 | 7/2006 | Wentker et al. |
| 2006/0178856 | A1 | 8/2006 | Roberts et al. |
| 2006/0178957 | A1 | 8/2006 | LeClaire |
| 2006/0178986 | A1 | 8/2006 | Giordano et al. |
| 2006/0184569 | A1 | 8/2006 | Aakolk et al. |
| 2006/0190337 | A1 | 8/2006 | Ayers, Jr. et al. |
| 2006/0208064 | A1 | 9/2006 | Mendelovich et al. |
| 2006/0208065 | A1 | 9/2006 | Mendelovich et al. |
| 2006/0212434 | A1 | 9/2006 | Crawford et al. |
| 2006/0229996 | A1 | 10/2006 | Keithley et al. |
| 2006/0242047 | A1 | 10/2006 | Haggerty et al. |
| 2006/0282348 | A1 | 12/2006 | Greenfield et al. |
| 2006/0293948 | A1 | 12/2006 | Weinblatt |
| 2007/0000996 | A1 | 1/2007 | Lambert et al. |
| 2007/0011089 | A1 | 1/2007 | DeSchryver |
| 2007/0022048 | A1 | 1/2007 | Kingsborough et al. |
| 2007/0038516 | A1 | 2/2007 | Apple et al. |
| 2007/0044027 | A1 | 2/2007 | Fischer |
| 2007/0053518 | A1 | 3/2007 | Tompkins et al. |
| 2007/0055597 | A1 | 3/2007 | Patel et al. |
| 2007/0061190 | A1 | 3/2007 | Wardell |
| 2007/0067209 | A1 | 3/2007 | Haggerty et al. |
| 2007/0067297 | A1 | 3/2007 | Kublickis |
| 2007/0073616 | A1 | 3/2007 | Silbernagel et al. |
| 2007/0084917 | A1 | 4/2007 | Fajkowski |
| 2007/0100691 | A1 | 5/2007 | Patterson |
| 2007/0124201 | A1 | 5/2007 | Hu et al. |
| 2007/0130062 | A1 | 6/2007 | Huh |
| 2007/0133949 | A1 | 6/2007 | Tatsuta et al. |
| 2007/0136252 | A1 | 6/2007 | Teare et al. |
| 2007/0150349 | A1 | 6/2007 | Handel et al. |
| 2007/0156557 | A1 | 7/2007 | Shao et al. |
| 2007/0162337 | A1 | 7/2007 | Hawkins et al. |
| 2007/0162377 | A1 | 7/2007 | Williams |
| 2007/0174126 | A1 | 7/2007 | McCall et al. |
| 2007/0174295 | A1 | 7/2007 | Abraham et al. |
| 2007/0179846 | A1 | 8/2007 | Jain et al. |
| 2007/0192121 | A1 | 8/2007 | Routson |
| 2007/0192122 | A1 | 8/2007 | Routson et al. |
| 2007/0198335 | A1 | 8/2007 | Edwards et al. |
| 2007/0219865 | A1 | 9/2007 | Leining |
| 2007/0219866 | A1 | 9/2007 | Wolf et al. |
| 2007/0221728 | A1 | 9/2007 | Ferro et al. |
| 2007/0226056 | A1 | 9/2007 | Belanger et al. |
| 2007/0226061 | A1 | 9/2007 | Chen et al. |
| 2007/0239532 | A1 | 10/2007 | Benson et al. |
| 2007/0244741 | A1 | 10/2007 | Blume et al. |
| 2007/0255604 | A1 | 11/2007 | Seelig |
| 2007/0260736 | A1 | 11/2007 | Miller |
| 2007/0265923 | A1 | 11/2007 | Krassner et al. |
| 2007/0267479 | A1 | 11/2007 | Nix et al. |
| 2007/0282681 | A1 | 12/2007 | Shubert et al. |
| 2007/0288312 | A1 | 12/2007 | Wang |
| 2008/0004884 | A1 | 1/2008 | Flake et al. |
| 2008/0004951 | A1 | 1/2008 | Huang et al. |
| 2008/0004953 | A1 | 1/2008 | Ma et al. |
| 2008/0004984 | A1 | 1/2008 | Sendo et al. |
| 2008/0005358 | A1 | 1/2008 | Kwon et al. |
| 2008/0010189 | A1 | 1/2008 | Rosenberger |
| 2008/0021829 | A1 | 1/2008 | Kranzley |

(56) References Cited

U.S. PATENT DOCUMENTS

| | | |
|---|---|---|
| 2008/0040261 A1 | 2/2008 | Nix et al. |
| 2008/0052164 A1 | 2/2008 | Abifaker |
| 2008/0059302 A1 | 3/2008 | Fordyce, III et al. |
| 2008/0059303 A1 | 3/2008 | Fordyce |
| 2008/0059306 A1 | 3/2008 | Fordyce et al. |
| 2008/0059307 A1 | 3/2008 | Fordyce, III et al. |
| 2008/0059434 A1 | 3/2008 | Williams et al. |
| 2008/0065457 A1 | 3/2008 | Hundt et al. |
| 2008/0071587 A1 | 3/2008 | Granucci et al. |
| 2008/0071680 A1 | 3/2008 | Sheets |
| 2008/0077487 A1 | 3/2008 | Davis et al. |
| 2008/0077499 A1 | 3/2008 | Ariff et al. |
| 2008/0082393 A1 | 4/2008 | Ozzie et al. |
| 2008/0082418 A1 | 4/2008 | Fordyce et al. |
| 2008/0086365 A1 | 4/2008 | Zollino et al. |
| 2008/0103887 A1 | 5/2008 | Oldham et al. |
| 2008/0120182 A1 | 5/2008 | Arnold et al. |
| 2008/0120218 A1 | 5/2008 | Reid et al. |
| 2008/0126208 A1 | 5/2008 | Nicholson et al. |
| 2008/0134228 A1 | 6/2008 | Dion et al. |
| 2008/0154704 A1 | 6/2008 | Flake et al. |
| 2008/0154727 A1 | 6/2008 | Carlson |
| 2008/0162269 A1 | 7/2008 | Gilbert |
| 2008/0167991 A1 | 7/2008 | Carlson et al. |
| 2008/0167992 A1 | 7/2008 | Kokernak et al. |
| 2008/0177602 A1 | 7/2008 | Sopher et al. |
| 2008/0184117 A1 | 7/2008 | Alsbury et al. |
| 2008/0191006 A1 | 8/2008 | White |
| 2008/0195465 A1 | 8/2008 | Redmond et al. |
| 2008/0195473 A1 | 8/2008 | Laramy et al. |
| 2008/0201226 A1 | 8/2008 | Carlson et al. |
| 2008/0215436 A1 | 9/2008 | Roberts |
| 2008/0217397 A1 | 9/2008 | Degliantoni et al. |
| 2008/0221972 A1 | 9/2008 | Megdal et al. |
| 2008/0228615 A1 | 9/2008 | Scipioni et al. |
| 2008/0235243 A1 | 9/2008 | Lee et al. |
| 2008/0255897 A1 | 10/2008 | Megdal et al. |
| 2008/0296369 A1 | 12/2008 | Bodington et al. |
| 2008/0300973 A1 | 12/2008 | DeWitt et al. |
| 2008/0318559 A1 | 12/2008 | Porco |
| 2008/0319843 A1 | 12/2008 | Moser et al. |
| 2008/0319847 A1 | 12/2008 | Shepard |
| 2008/0320512 A1 | 12/2008 | Knight |
| 2009/0006203 A1 | 1/2009 | Fordyce, III et al. |
| 2009/0006363 A1 | 1/2009 | Canny et al. |
| 2009/0018895 A1 | 1/2009 | Weinblatt et al. |
| 2009/0024484 A1 | 1/2009 | Walker et al. |
| 2009/0030793 A1 | 1/2009 | Fordyce, III |
| 2009/0037333 A1 | 2/2009 | Flitcroft et al. |
| 2009/0043593 A1 | 2/2009 | Herbrich et al. |
| 2009/0063333 A1 | 3/2009 | Nambiar et al. |
| 2009/0070219 A1 | 3/2009 | D'Angelo et al. |
| 2009/0070225 A1 | 3/2009 | Matz et al. |
| 2009/0076896 A1 | 3/2009 | DeWitt et al. |
| 2009/0094118 A1 | 4/2009 | Antonucci et al. |
| 2009/0112703 A1 | 4/2009 | Brown |
| 2009/0112721 A1 | 4/2009 | Hammad et al. |
| 2009/0112821 A1 | 4/2009 | Collet et al. |
| 2009/0119154 A1 | 5/2009 | Jung et al. |
| 2009/0119160 A1 | 5/2009 | Woda et al. |
| 2009/0119167 A1 | 5/2009 | Kendall et al. |
| 2009/0119170 A1 | 5/2009 | Hammad et al. |
| 2009/0119190 A1 | 5/2009 | Realini |
| 2009/0132347 A1 | 5/2009 | Anderson et al. |
| 2009/0132366 A1 | 5/2009 | Lam et al. |
| 2009/0132395 A1 | 5/2009 | Lam et al. |
| 2009/0144147 A1 | 6/2009 | Sheaffer |
| 2009/0144161 A1 | 6/2009 | Fisher |
| 2009/0144201 A1 | 6/2009 | Gierkink et al. |
| 2009/0150237 A1 | 6/2009 | Gupta et al. |
| 2009/0157511 A1 | 6/2009 | Spinnell et al. |
| 2009/0164325 A1 | 6/2009 | Bishop et al. |
| 2009/0164327 A1 | 6/2009 | Bishop et al. |
| 2009/0172551 A1 | 7/2009 | Kane et al. |
| 2009/0172728 A1 | 7/2009 | Shkedi et al. |
| 2009/0192874 A1 | 7/2009 | Powles et al. |
| 2009/0192875 A1 | 7/2009 | Bene et al. |
| 2009/0192882 A1 | 7/2009 | Narahashi et al. |
| 2009/0192904 A1 | 7/2009 | Patterson et al. |
| 2009/0192941 A1 | 7/2009 | Fournier et al. |
| 2009/0204525 A1 | 8/2009 | Phillips |
| 2009/0216579 A1 | 8/2009 | Zen et al. |
| 2009/0216616 A1 | 8/2009 | Wang et al. |
| 2009/0222323 A1 | 9/2009 | Kelly et al. |
| 2009/0234708 A1 | 9/2009 | Heiser, II et al. |
| 2009/0234711 A1 | 9/2009 | Ramer et al. |
| 2009/0234715 A1 | 9/2009 | Heiser, II et al. |
| 2009/0234737 A1 | 9/2009 | Sarelson et al. |
| 2009/0248496 A1 | 10/2009 | Hueter et al. |
| 2009/0248497 A1 | 10/2009 | Hueter |
| 2009/0248511 A1 | 10/2009 | Mehta et al. |
| 2009/0248573 A1 | 10/2009 | Haggerty et al. |
| 2009/0249384 A1 | 10/2009 | Fang et al. |
| 2009/0254414 A1 | 10/2009 | Schwarz et al. |
| 2009/0259518 A1 | 10/2009 | Harvey et al. |
| 2009/0271305 A1 | 10/2009 | Lal et al. |
| 2009/0271327 A1 | 10/2009 | Lal et al. |
| 2009/0299846 A1 | 12/2009 | Brueggemann et al. |
| 2009/0307049 A1 | 12/2009 | Elliott, Jr. et al. |
| 2009/0307060 A1 | 12/2009 | Merz et al. |
| 2010/0036768 A1 | 2/2010 | DiGioacchino |
| 2010/0036769 A1 | 2/2010 | Winters et al. |
| 2010/0049620 A1 | 2/2010 | Debow |
| 2010/0057549 A1 | 3/2010 | Boal |
| 2010/0076836 A1 | 3/2010 | Giordano et al. |
| 2010/0100416 A1 | 4/2010 | Herbrich et al. |
| 2010/0106568 A1 | 4/2010 | Grimes |
| 2010/0106569 A1 | 4/2010 | Grimes |
| 2010/0106584 A1 | 4/2010 | Etheredge et al. |
| 2010/0114677 A1 | 5/2010 | Carlson et al. |
| 2010/0114683 A1 | 5/2010 | Wessels et al. |
| 2010/0114686 A1 | 5/2010 | Carlson et al. |
| 2010/0125490 A1 | 5/2010 | Kiciman et al. |
| 2010/0174623 A1 | 7/2010 | McPhie et al. |
| 2010/0185489 A1 | 7/2010 | Satyavolu et al. |
| 2010/0185534 A1 | 7/2010 | Satyavolu et al. |
| 2010/0211445 A1 | 8/2010 | Bodington |
| 2010/0256982 A1 | 10/2010 | Bhagchandani et al. |
| 2010/0274625 A1 | 10/2010 | Carlson |
| 2010/0274627 A1 | 10/2010 | Carlson |
| 2010/0280880 A1 | 11/2010 | Faith et al. |
| 2010/0280881 A1 | 11/2010 | Faith et al. |
| 2010/0280882 A1 | 11/2010 | Faith et al. |
| 2010/0280927 A1 | 11/2010 | Faith et al. |
| 2010/0280950 A1 | 11/2010 | Faith et al. |
| 2010/0306029 A1 | 12/2010 | Jolley |
| 2010/0306032 A1 | 12/2010 | Jolley |
| 2011/0029367 A1 | 2/2011 | Olson et al. |
| 2011/0029430 A1* | 2/2011 | Norris .................. G06Q 20/10 705/39 |
| 2011/0035278 A1 | 2/2011 | Fordyce, III et al. |
| 2011/0035280 A1 | 2/2011 | Fordyce, III et al. |
| 2011/0035288 A1 | 2/2011 | Clyne |
| 2011/0047072 A1 | 2/2011 | Ciurea |
| 2011/0087519 A1 | 4/2011 | Fordyce, III et al. |
| 2011/0087546 A1 | 4/2011 | Fordyce, III et al. |
| 2011/0087547 A1 | 4/2011 | Amaro et al. |
| 2011/0087550 A1 | 4/2011 | Fordyce, III et al. |
| 2011/0093324 A1 | 4/2011 | Fordyce, III et al. |
| 2011/0093335 A1 | 4/2011 | Fordyce, III et al. |
| 2011/0207440 A1 | 8/2011 | Ruuspakka et al. |
| 2011/0264497 A1 | 10/2011 | Clyne |
| 2011/0264501 A1 | 10/2011 | Clyne |
| 2011/0264567 A1 | 10/2011 | Clyne |
| 2011/0264581 A1 | 10/2011 | Clyne |
| 2011/0313870 A1 | 12/2011 | Eicher et al. |
| 2012/0005019 A1 | 1/2012 | LeBlanc et al. |
| 2012/0030006 A1 | 2/2012 | Yoder et al. |
| 2012/0078701 A1 | 3/2012 | Woods |
| 2012/0109749 A1 | 5/2012 | Subramanian et al. |
| 2012/0226995 A1* | 9/2012 | Kimchi .................. G06F 16/248 715/747 |
| 2013/0066771 A1 | 3/2013 | Ciurea et al. |
| 2013/0179201 A1 | 7/2013 | Fuerstenberg et al. |

(56) References Cited

U.S. PATENT DOCUMENTS

| | | | |
|---|---|---|---|
| 2013/0211987 | A1 | 8/2013 | Louie et al. |
| 2015/0039490 | A1 | 2/2015 | Forrester et al. |
| 2015/0106225 | A1 | 4/2015 | Glass et al. |
| 2016/0335653 | A1 | 11/2016 | Bodington |
| 2016/0371692 | A1 | 12/2016 | Clyne |

FOREIGN PATENT DOCUMENTS

| | | | |
|---|---|---|---|
| JP | 2003122994 | A | 4/2003 |
| KR | 20020062030 | A | 7/2002 |
| KR | 20040016771 | A | 2/2004 |
| KR | 20040107715 | A | 12/2004 |
| KR | 20050044215 | A | 5/2005 |
| KR | 20050059838 | A | 6/2005 |
| KR | 20070030415 | A | 3/2007 |
| KR | 20070085252 | A | 8/2007 |
| KR | 20070092773 | A | 9/2007 |
| KR | 20080104398 | A | 12/2008 |
| KR | 20090035503 | A | 4/2009 |
| WO | 9922328 | A1 | 5/1999 |
| WO | 9950775 | A1 | 10/1999 |
| WO | 0060435 | A2 | 10/2000 |
| WO | 0062231 | A1 | 10/2000 |
| WO | 0137183 | A1 | 5/2001 |
| WO | 0139023 | A2 | 5/2001 |
| WO | 0157758 | A1 | 8/2001 |
| WO | 0193161 | A1 | 12/2001 |
| WO | 0205116 | A2 | 1/2002 |
| WO | 0214985 | A2 | 2/2002 |
| WO | 0219229 | A2 | 3/2002 |
| WO | 0242970 | A1 | 5/2002 |
| WO | 02071187 | A2 | 9/2002 |
| WO | 03025695 | A2 | 3/2003 |
| WO | 03081376 | A2 | 10/2003 |
| WO | 2005001631 | A2 | 1/2005 |
| WO | 2005076181 | A1 | 8/2005 |
| WO | 2006028739 | A2 | 3/2006 |
| WO | 2006078750 | A2 | 7/2006 |
| WO | 2006126205 | A2 | 11/2006 |
| WO | 2007127729 | A2 | 11/2007 |
| WO | 2007131258 | A1 | 11/2007 |
| WO | 2007136221 | A1 | 11/2007 |
| WO | 2008013945 | A2 | 1/2008 |
| WO | 2008023912 | A2 | 2/2008 |
| WO | 2008055217 | A2 | 5/2008 |
| WO | 2008064343 | A1 | 5/2008 |
| WO | 2008067543 | A2 | 6/2008 |
| WO | 2008124168 | A1 | 10/2008 |
| WO | 2008144643 | A1 | 11/2008 |
| WO | 2008150606 | A2 | 12/2008 |
| WO | 2009031823 | A2 | 3/2009 |
| WO | 2010017247 | A2 | 2/2010 |
| WO | 2010141255 | A2 | 12/2010 |
| WO | 2010141270 | A2 | 12/2010 |
| WO | 2011014710 | A2 | 2/2011 |
| WO | 2012018841 | A2 | 2/2012 |
| WO | 2012061523 | A1 | 5/2012 |

OTHER PUBLICATIONS

Anderson et al., "NetCard—A Practical Electronic Cash System", Cambridge University, Dec. 31, 1996, retrieved Dec. 6, 2009, URL: http://www.cl.cam.ac.uk/~rja14/Papers/netcardpdf.

BrickRed, "Case Study: ATM curn e-wallet Card," BrickRed Aug. 19, 2008, retrieved Aug. 19, 2008, URL: http://www.brickred.com/smartcards/ewallet.jsp.

Carten et al., "Consumer Behavior and Payment Choice: 2006 Conference Summary," No. 07-4, Federal Reserve Bank of Boston, Jul. 16, 2007.

Cashmore, "YouTube Ads: You Hate Em", available at http://mashable.com/2009/04/05/youtube-ads-youhate-em/#, Apr. 5, 2009.

Conservation Tax Credit Transfer, LLC, company information located at http://www.taxtransfer.net/, accessed Mar. 29, 2010.

Hausman et al., "On nonexclusive membership in competing joint ventures", RAND Journal of Economics, vol. 34, No. 1, Spring 2003, pp. 43-62, available at: http://www.dklevine.com/archive/refs4506439000000000145.pdf.

Li, "Knowledge Gathering and Matching in Heterogenous Databases", Working Notes of the AAAI Spring Symposium on Information Gathering, pp. 116-1216, Mar. 27, 1995.

Mielikainen, "Privacy Problems with Anonymized Transaction Databases," 7th International Conference on Discovery Science, pp. 219-229, Oct. 2, 2004.

Munoz et al., "Comparison of statistical methods commonly used in predictive modelling", Journal of Vegetation Science, vol. 15, 2004, pp. 285-292. Available at: http://www.salford-systems.com/doc/JardinBotanicoUserStory.pdf.

Oracle, "Oracle Fusion Middleware Concepts Guide," 11g Release 1(11.1.1), E10103-03, Jan. 2010.

Punj et al., "Cluster Analysis in Marketing Research: Review and Suggestions for Application", Journal of Marketing Research, vol. 20, pp. 134-148, May 1983.

Rysman, "An Empirical Analysis of Payment Card Usage", The Journal of Industrial Economics 55, 2007.

Rob & Coronel, Database Systems, Design, Implementation and Management, 6th Edition (Thompson Course Technology 2004) Section 3.4—Relational Database Operators, pp. 86-89.

Staten et al., "College Student Credit Card Usage", Credit Research Center Working Paper #65, Georgetown University, Jun. 2002, available at: http://faculty.msb.edu/prog/CRC/pdf/WP65.pdf.

Statistics Tutorial: Estimating a Proportion (Large Sample), Apr. 13, 2008, pp. 1-4. Available at: http://stattrek.com/lesson4/proportion.aspx.

The historical development of segmentation: The example of the German book trade 1800-1928 B Wooliscroft, RA Fullerton—Journal of Historical Research in Marketing, 2012—emeraldinsight.com.

Thomas, "A survery of credit and behavioural scoring: forecasting financial risk of lending to consumers", International Journal of Forecasting, vol. 16, 2000, pp. 149-172. Available at: http://www.yaroslavvb.com/papers/thomas-survey.pdf.

Van Grove, "Are Your Online Video Ads Driving Actual Offline Purchases?", available at http://mashable.com/2009/05/18/video-impact/#, May 18, 2009.

Wikimedia Foundation, Inc., "Factor Analysis", Wikipedia online encyclopedia entry located at http://en.wikipedia.org/wiki/Factor_analysis. accessed Apr. 30, 2010.

\* cited by examiner

2 Choose Benefits

Travel Package

- ■ Auto Rental Collision Damage Waiver
  Call for an emergency cash advance — Details
- ■ Companion Airline Ticket
  Peace of mind — Details
- ■ Lost Luggage Reimbursement
  Shop worry-free at millions of merchants — Details Continue

FIG. 6

3 Add-on & Options

| Features | Annual Fee | Dollar Value |
|---|---|---|
| ■ Personal Identity Theft ⓘ Protect from unauthorized use | $2 | $25 |
| ☐ Year-End Summary ⓘ Receive an annual report of expenditures | $2 | $100 |
| ☐ Concierge Services ⓘ Receive 24/7 access | $25 | $300 |

◇ Bank  Your Account | Contact Us | Privacy Notice

| Accounts | Payments | Transfer | Services | Customer Service |  Sign Out

Banking Accounts

| Account | Available Balance | Total Balance |
|---|---|---|
| MyChecking (...4539) | $4,098.34 | $4,098.34 |
| MySavings (...4540) | $14,032.64 | $14,032.64 |

Other Accounts

| Account | Outstanding Balance | Total Credit |
|---|---|---|
| Credit Card (...5678) | $342.43 | $8,000.00 |

View Details   Make One-Time Payment   Setup Recurring Payment
Shop Card Benefits
⟩ 401

Quick Links

Pay Bills
Make a Secure Transfer
Update Account Info
Shop Card Benefit
⟩ 401

⬅ Back to Bank.com     How it Works   FAQ   Contact Us     My Account   My Inbox   ⇨ Logout

Card Benefits   Welcome Lisa!          ⬚ Bank
Home   My Benefits          405

| | | |
|---|---|---|
| Travel | | Lisa Smith |
| Credit & Identity | | Card ending in 5678 |
| Life & Health | ▶ | Alerts   407 |
| Shopping | | You have not verified your email address for Electronic Disclosure. Please click here to complete. |
| Concierge | | Messages     View All |
| | | Change Benefits |
| | | Dear Lisa, our records shows that you change ... |

My Benefits   View Full List of Current Benefits ⟍ 413        409 ⟍ [ Shop Benefits ]

| Travel Package Lit ⓘ | Coverage | Fees | |
|---|---|---|---|
| Auto Rental Collision Damage Waiver | USD 1000 | Included | ⎫ |
| Cardholder Inquiry Service | USD 2500 | Included | ⎬ 411 |
| Purchase Security | USD 500 per claim | Included | ⎭ |

| | 403 | | | | | |
|---|---|---|---|---|---|---|
| ⇦ Back to Bank.com | | How it Works  FAQ  Contact Us | My Account  My Inbox | ⇨ Logout |

Card Benefits  Welcome Lisa!                                 ⬧ Bank
Home  My Benefits                                                      405

Current    Shop
_____

Select Package        1. Select Package ▶ 2. View Package Details & Place Order        Print

| Select | Packages | Compare | Compare |
|---|---|---|---|
| | | | You can compare up to 3 packages at a time |
| ⦿ | Travel Lit (Current Package)  Travel with peace of mind with benefits like auto rental collision damage waiver ... | ☐ | 1. _____ |
| ○ | Travel Plus  Feet on wheels? This package helps take out the hassle in your everyday travel ... | ☐ | 2. _____ |
| | | | 3. _____ |
| | ⋱ | | [ Compare ] |

| | Shop Lite | Shopping Plus | Travel Plus |
|---|---|---|---|
| Warranty Management Service | USD 10000 | USD 10000 | USD XXX |
| Cardholder Inquiry Service | Service | Service | USD XXX |
| Emergency Card Replacement | Service | Service | USD XXX |
| Emergency Cash Disbursement | Service | Service | USD XXX |
| Lost/Stolen Card Reporting | Service | Service | USD XXX |
| Rewards Program | Reward Points | Reward Points | USD XXX |

FIG. 23

| | | | Effective | Terms of |
| Benefit | Coverage | Fees | Date | Use |
| Warranty Manager Service<br>Call 1-800-888-8888 for customer service<br>⊙ Show Details | USD 10000 | Included | 5/20/2012 | View |
| Cardholder Inquiry Service<br>Call 1-800-888-8888 for customer service<br>⊙ Show Details | Service | Included | 5/20/2012 | View |

☑ I have read and I Accept all the Terms of Use    Place Order

Go Back

⬅ Back to Bank.com    How it Works  FAQ  Contact Us    My Account  My Inbox  ⇨ Logout

Card Benefits  Welcome Lisa!    ⬨ Bank
Home  My Benefits    405

Current    Shop

Thank You! We have received your order.  Your order number is 1231234    Print

We received your re[...]
Want to Save Pape[...]                                                                    ✕

Electronic Disclo[...]    Opt-in to Electronic Disclosure

Shopping Plus ⓘ    New option for receiving program disclosures

Benefit    Electronic Disclosure    ⦿ Yes, send me electronic program
          Option:        disclosures
Warranty M[...]
Call 1-800-[...]          ○ No, do not send me electronic
⊙ Show D[...]              program disclosures Cardholder[...]    Email:    [Email Address]
Call 1-800-[...]
⊙ Show D[...]             [Re Enter Email Address]

• • •                                          Submit    Skip

⇐ Back to Bank.com     How it Works   FAQ   Contact Us     My Account   My Inbox   ⇨ Logout

Card Benefits   Welcome Lisa!        ⬙ Bank
Home   My Benefits                         405

Current    Shop

Thank You! We have received your order. Your order number is 1231234     Print

We received your re...
Want to Save Paper...

Success!        ✕

Electronic Disclo...
Electronic Disclosures are now turned on

Shopping Plus ⓘ

Benefit

Warranty M...
Call 1-800-...
⊙ Show D...

Cardholder...
Call 1-800-...
⊙ Show D...

Close

| ⇐ Back to Bank.com | How it Works | FAQ  Contact Us | My Account  My Inbox | ⇒ Logout |

Card Benefits Welcome Lisa!    427                                   ⊠ Bank

Home  My Benefits

How It Works

Did you know that your account and card have benefits attached to them? They do! These benefits can help you with travel, lost or stolen cards, cash advances and much more, depending on the benefits provided by your card issuer. Using and improving your benefits is as easy as 1-2-3!

1. Discover what you have
It's easy to discover what benefits you have, and change them if other benefits suit your lifestyle better. You can see what you have by logging into this website and accepting some simple Terms and Conditions. You will be taken to a View Benefits page.

2. Compare and choose new benefits
Once there, you can choose to compare your current benefits with others associated with the benefits portfolio offered by your card issuer. If you see a change in benefits that suits you better, add it to your cart.

3. Place an order
Placing an order and checking out with your new benefits is easy. Review any possible costs, accept the terms and conditions of the changed benefit, finalize your purchase, and you're done.
Even though you may be excited to use your new benefits, keep in mind that it may take some time for these benefits to be activated. Be sure you're new benefits are available to you before using them to avoid disappointment

⬅ Back to Bank.com    How it Works  FAQ  Contact Us    My Account | My Inbox    ⇒ Logout

Card Benefits  Welcome Lisa!                                439    ◇ Bank
Home  My Benefits                                                       405

My Inbox

| ▼Subject | ▼ Date (PST) |
|---|---|
| ☐ You have updated the ... | 06/23/2012 |
| Dear Lisa, Our records show that you changed the Bank Card Benefits on your card ending in 6548 as of... | |
| ☐ You have updated the ... | 06/23/2012 |
| Dear Lisa, Our records show that you changed the Bank Card Benefits profile. If you did not make ... | |

Message            Delete  Print    [< Previous] [Next >]

Important Update: Your Action Required to confirm electronic disclosures!

From: Bank Card Benefits
Sent: Tue 6/5/2012 1:21 (PST)

Dear Lisa,

Thank you for opting to receive future updates to Bank Card Benefits program terms and conditions through email. The e-mail address in your account profile is unconfirmed. In order to verify that your e mail address is correct we have sent a confirmation e-mail to you. Please click on the link in that e mail to confirm your e-mail address. Please note that we will be unable to send program disclosure updates to you electronically until you have confirmed your e-mail address.

If you have any questions. please call 1-800-888-8888

Thank You!

FIG. 33

SYSTEMS AND METHODS TO PROVIDE ACCOUNT FEATURES VIA WEB BASED USER INTERFACES

RELATED APPLICATIONS

The present application is a continuation of U.S. application Ser. No. 14/106,380, filed Dec. 13, 2013, which claims priority to U.S. Pat. App. Ser. No. 61/736,986, filed Dec. 13, 2012 and entitled "Systems and Methods to Provide Account Features via Web based User Interfaces", the disclosures of which are hereby incorporated herein by reference in their entireties.

The present application relates to U.S. patent application Ser. No. 12/845,591, filed Jul. 28, 2010 and entitled "System and Method to Provide Benefits of Account Features to Account Holders," U.S. patent application Ser. No. 12/845,645, filed Jul. 28, 2010 and entitled "Systems and Methods to Generate Transactions According to Account Features," and U.S. patent application Ser. No. 12/025,267, filed Feb. 4, 2008 and entitled "System and Method for Managing Enhancement Features Assigned to Financial Presentation Devices," the disclosures of which applications are hereby incorporated herein by reference.

FIELD OF THE TECHNOLOGY

At least some embodiments of the present disclosure relate to a data processing apparatus, and more particularly a system to manage account features assigned to financial accounts that can be used to make payments for goods and services.

BACKGROUND

Credit cards, debit cards, prepaid cards, stored value devices and smart tag devices can be used to pay for goods and services without using cash. Such financial presentation devices are associated with financial accounts identified by account numbers. In the case of a credit card, the account number typically has a 16 digit card number embossed on the card. The 16 digit number consists of an initial 6 digit Bank Identification Number (BIN), followed by a 10 digit number. The BIN identifies the issuer bank that issued the card. The remaining 10 digit number identifies a particular card issued by the issuer. Accordingly, the 16 digit number on the credit card uniquely identifies a card and therefore the cardholder or account holder.

Over the years, the card issuers have developed different card types to more effectively target a variety of customer segments and to serve customer needs and increase card usage at the same time. Different types of cards are assigned different account features, or enhancement features.

Enhancement features are typically services or goods that a card issuer provides in addition to processing purchase transactions. Examples of enhancement features include zero liability from loss of card, auto rental collision damage waiver, emergency cash disbursement and card replacement, lost/stolen card reporting, extra warranty period for products, travel accident insurance, lost luggage reimbursement, roadside dispatch, cash back and frequent flyer mileage, airport lounge access, extra warranty period and companion airline ticket.

Conventionally, the account features are assigned to a card type; and card types are identified by the 6 digit BIN or the 9 digit BIN range of the account number. In other words, account features are determined by the initial 6 or 9 digits of the account number. Accordingly, when a cardholder contacts a provider of an enhancement feature, the provider only needs to ask for the initial 6 or 9 digits of the account number to determine whether the cardholder is entitled to a particular enhancement feature.

BRIEF DESCRIPTION OF THE DRAWINGS

The embodiments are illustrated by way of example and not limitation in the figures of the accompanying drawings in which like references indicate similar elements.

FIGS. 3-9 illustrate user interfaces to manage an account according to one embodiment.

FIGS. 19-33 illustrate user interfaces configured to facilitate the acquisition of account features according to one embodiment.

DETAILED DESCRIPTION

Figure 1:
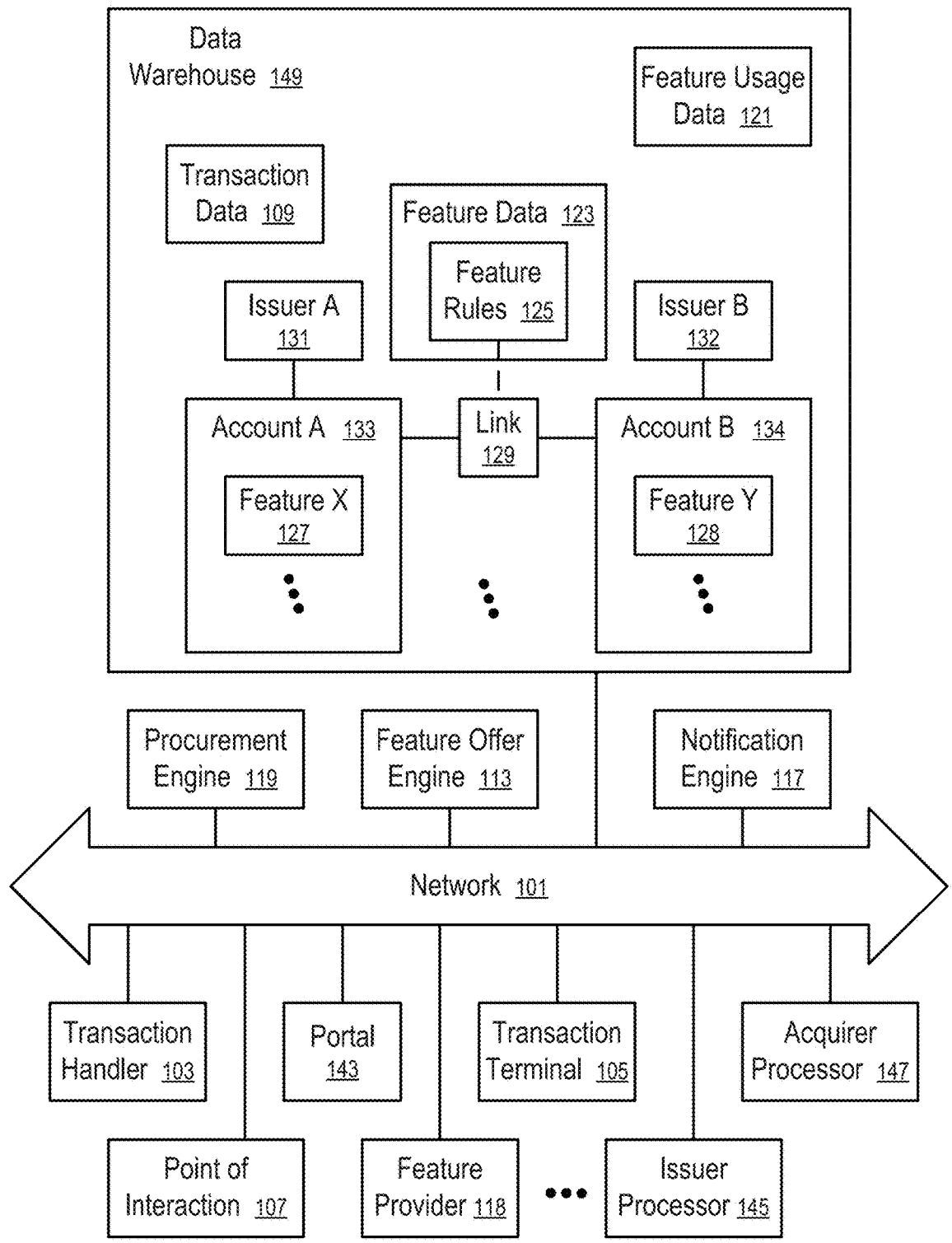
FIG. 1 shows a system to enable feature sharing in a plurality of accounts according to one embodiment.

In one embodiment, a centralized data service is provided to identify the account features at account level. Thus, each account can have a customized set of account features, independent of other accounts that share a common portion of account numbers (e.g., the initial 6 or 9 digits of account numbers).

In one embodiment, the features of the accounts are specified in a centralized data warehouse for individual accounts, instead of individual account types. The feature specification of one account, initially having the same set of features as a set of other accounts, can be changed without affecting the feature specifications of that set of other accounts and without having to use a different account number. Some details on managing enhancement features at the account level according to one embodiment are provided in U.S. patent application Ser. No. 12/025,267, filed Feb. 4, 2008 and entitled "System and Method for Managing Enhancement Features Assigned to Financial Presentation Devices," the disclosure of which is hereby incorporated herein by reference.

In one embodiment, a portal is configured to provide access to the account feature data via a set of Application Programming Interfaces (APIs). The API allows a partner, such as a feature provider, an issuer, a call center for customer services, etc., to build applications tailored to their needs and preferences, using the centralized account feature data. In one embodiment, the APIs are provided via web services; and the account feature data is secured via a firewall and/or a set of computers each controlling a portion of the account feature data. Further details and examples regarding the APIs in one embodiment are provided in the section entitled "API."

In one embodiment, a portal is configured to provide user interfaces to users to access and/or purchase account features in connection with websites of issuers. The user interfaces have white label configurability that allows the issuers to customize the labeling of the user interfaces such that the user interfaces can be perceived as part of the websites of the issuers of the consumer accounts of the respective users. The user interfaces are configured to present, in a user friendly way, the account features currently in the consumer accounts, as well as optional account features that can be purchased at additional costs. Further details and examples regarding the user interfaces in one embodiment are provided in the section entitled "WHITE LABEL."

In one aspect, systems and methods are provided to allow a group of financially connected accounts, such that the accounts held by one or more members in a household, to share account features. When a number of account holders are likely to share financial resources, a feature sharing arrangement can be provided to improve experience. Through the sharing arrangement, the benefit afforded by an account feature of one of the accounts can be extended to the other accounts in the group. The members in the group can share the benefits of the account features without having to physically share the account identification devices, such as credit cards, debit cards, etc.

For example, a married couple might have different accounts from the same issuer. The accounts may have different sets of account features. For example, while the account of the wife is entitled to Price Protection on all retail purchase through the use of her consumer credit card, the account of the husband is not. Through the sharing arrangement, the Price Protection feature is extended to the account of the husband. In one embodiment, upon the identification of the qualification for sharing in view of the rule set governing the sharing arrangement, the benefit of this Price Protection feature is automatically extended to the account of the husband. In another embodiment, upon the identification of qualification for this Price Protection feature, the husband is presented with the offer to add this feature to his account.

In another aspect, systems and methods are provided to trigger further transactions in response to certain transactions qualifying for offers associated with account features, such as a purchase to take advantage of the benefit of an account feature previously assigned to the account or the purchase of the account feature if it is not already in the account. In one embodiment, the account holder is notified of the further transaction triggered by the qualifying transaction. In one embodiment, the account holder is provided with an option to approve or disapprove the triggered transaction.

For example, one account feature provides premium trip cancellation coverage. If the account is used to pay for a purchase, such as an airline ticket, qualifying for the benefit of the coverage and the account does not already have this account feature, a notification is provided to the account holder to enroll in the account feature, with a fee or without a fee. In one embodiment, the account feature is added without the need for further input from the account holder. In another embodiment, the approval from the account holder is required to add the account feature. If the account has this feature for premium trip cancellation coverage, the qualifying purchase, such as the airline ticket, is to trigger a transaction to purchase insurance at a predefined fee in accordance with the account feature. In one embodiment, a notification is provided to the account holder about the insurance purchase. In one embodiment, the account holder is provided with a choice to approve or disapprove the insurance transaction triggered by the qualifying purchase.

Further details and/or aspects are provided below.

FIG. 1 shows a system to enable feature sharing in a plurality of accounts according to one embodiment. In FIG. 1, the feature rules (125) allow the identification of the link (129) between account A (133) and account B (134) for feature sharing. The presence of the link (129) allows a feature sharing arrangement between account A (133) and account B (134). In some instances in this description, feature sharing is also referred to as householding, such as when the sharing is among account holders who are in the same household. In one embodiment, the feature rules (125) include a householding rule set established by a transaction handler (103), or an issuer (131 or 132). The benefit of householding (e.g., through account linking and multi-card grouping) is to entitle an individual or group of individuals to card features they would either not be entitled to, or features that would not normally be shared across cards accounts for different products or for the benefit of additional features.

For example, in one embodiment, account A (133) has feature X (127) but not feature Y (128); and account B (134) has feature Y (128) but not feature X (127). The presence of the link (129) allows the account holder of account B (134) to receive the benefit afforded by feature X (127) of account A and the account holder of account A (133) to receive the benefit afforded by feature Y (128) of account B (134).

In one embodiment, account A (133) is from issuer A (131); and account B (134) is from issuer B (132), which is different from issuer A (131). In some embodiments, the feature sharing is allowed between accounts (133 and 134) when the issuers (131 and 132) are the same. In some embodiments, the feature sharing is allowed even when the issuers (131 and 132) are different. In one embodiment, the feature rules (125) specify the conditions that are to be met to establish the link (129).

In one embodiment, householding or feature sharing includes identifying and linking multiple accounts (e.g., 133 and 134) having a common attribute set for the purpose of shared entitlement to account features (or card features). For example, in one embodiment, householding is permitted when the accounts (133 and 134) share at least one account holder. For example, in one embodiment, householding is permitted when the accounts (133 and 134) are held by persons in the same household, such as husband and wife. For example, in one embodiment, householding is not permitted when the billing addresses of the accounts (133 and 134) are different and/or the accounts (133 and 134) do not share a common account holder.

In one embodiment, individual account holders can use the portal (143) to manage the householding relationship and/or select account features. For example, in one embodiment, the account holder of account A (133) is to use the portal (143) to request the link (129) between accounts A and B (133 and 134) for householding. When the request is permitted by the feature rules (125) established by the transaction handler (103), issuer A (131) of account A (133) and/or issuer B (132) of account B (134), the link (129) is established between account A (133) and account B (134).

In one embodiment, the portal (143) is coupled to the data warehouse (149) via the network (101). The portal (143) communicates with the point of interaction (107) of account holders to provide user interfaces to customize the feature sets of the corresponding accounts (e.g., 133, 134) of the account holders.

In one embodiment, the permission for feature sharing is granted to individual features. For example, in one embodiment, after the link (129) is established to indicate that accounts A and B (133 and 134) satisfy the relationship requirement for householding, the sharing of individual features is further based on the feature rules (125) and the requests or authorizations from the account holders. For example, in one embodiment, one feature in account A (133) is extended to account B (134) while another feature in account A (133) is not extended to account B (134). For example, one or more features in account B (134) is extended to account A (133), while other features in account B (134) are not available to account A (133), in accordance with the feature rules (125) and/or the preferences of the account holders.

In one embodiment, the feature offer engine (113) is to examine the account data in view of the feature rules (125) to identify the link (129), without the account holders having to make explicit requests. In some embodiments, the feature offer engine (113) is to identify the features that can be extended via householding and then provide offers to the respective account holders for authorization and/or confirmation.

In one embodiment, to implement the feature sharing or householding, the data warehouse (149) is to store a table of entities (e.g., households, employers, or cardholders for multiple cards) with each entity storing information identifying associated accounts. In one embodiment, the link (129) represents such an entity.

In one embodiment, the system in FIG. 1 includes a procurement engine (119) to manage feature data (123) of features (e.g., 127, 128) assigned or to be assigned to the accounts.

For example, different feature provides (e.g., 118) may use the procurement engine (119) to provide bids to offer services or products involved in the fulfillment of the features. The transaction handler (103) and/or the issuers (e.g., 131 and 132) may select the services or products recorded in the feature data (123) based on the offers from the feature providers (e.g., 118).

In one embodiment, the costs of the features are sponsored by the issuers (e.g., 131, 132), the transaction handler (103), or a third party, such as the feature provider (118). In one embodiment, the costs of the features are shared among multiple parties, such as an issuer (e.g., 131 or 132), the transaction handler (103), a third party, such as the feature provider (118), and/or the account holder. In one embodiment, the costs of the features are mainly paid for by the account holder, with a discount or incentive provided by the issuer (e.g., 131 or 132), the transaction handler (103), and/or a third party, such as the feature provider (118).

In FIG. 1, the transaction handler (103) is to process transactions between an acquirer processor (147) and an issuer processor (145). The acquirer processor (147) is connected via the network (101) to the transaction terminal (105) that is typically associated with a merchant. The acquirer processor (147) processes the transactions on behalf of the merchant; and the issuer processor (145) processes the transactions on behalf of the account holder. In one embodiment, more than one acquirer processor (147) is connected to the transaction handler (103) via the network (101); more than one issuer processor (145) is connected to the transaction handler (103) via the network (101); and the transaction handler (103) connects the acquirer processor (147) to the issuer processor (145) for the respective transaction based on the identity of the issuer (e.g., 131 or 132) of the account (e.g., 133 or 134) used to make the payment for the transaction. In one embodiment, the transaction handler (103) acts as a switch between acquirers and issuers for routing messages therebetween for purposes of authorization, clearing and/or settlement of financial transactions.

In one embodiment, the transaction handler (103) stores the transaction data (109) recording the transactions processed at the transaction handler (103) for one or more acquirers and for one or more issuers (e.g., 131, 132). The transaction data (109) can be used to customize offers to the account holders, as discussed below.

In one embodiment, the portal (143) of the transaction handler (103) provides the centralized location to access the data related to and/or the benefits of the features (e.g., 127, 128). For example, in one embodiment, when the account holder of account A (133) contacts the services or products of the feature provider (118) for the benefit of a feature (e.g., 127) of account A (133), the feature provider (118) is to use the portal (143) to determine when the account holder is eligible for the benefit. For example, in one embodiment, an account holder is to use the portal (143) to claim the benefit of an account feature (e.g., 127 or 128).

In one embodiment, the portal (143) and the data warehouse (149) provide an aggregate view and feedback from feature providers (e.g., 118) on usage and trend analysis. Similarly the portal (143) provides account holders with an aggregate view of the account features (e.g., 127, 128) and/or services or benefits available in their accounts (e.g., 133, 134). The portal (143) provides a centralized location from which to request or process services.

In one embodiment, the notification engine (117) is to notify the account holder via an email, a text message, a voice message, etc., when a transaction of the account holder qualifies for the benefit of a feature (e.g., 127), or when the account holder is eligible for the offer of an account feature. In one embodiment, the notification is in real time as the transaction is being processed by the transaction handler (103). In one embodiment, the notification is provided after the transaction is settled.

In one embodiment, feature usage data (121) is recorded in the data warehouse (149). The feature offer engine (113) is to use the feature usage data (121) and/or the transaction data (109) to offer or recommend features for the account holders. For example, a feature (e.g., 127) can be provided as a reward to an account holder, if the transaction data (109) indicates that spending of the account holder satisfies one or more thresholds. For example, the feature offer engine (113) may use the transaction data (109) and the feature usage data (121) to identify spending patterns of account holders that use a particular feature (e.g., 127) and the identify account holders having similar spending patterns in offering the particular feature (e.g., 127).

In one embodiment, the account features (e.g., 127 and 128) are linked not only to the account (e.g., 133 and 134) but also to the form factor of the account identification devices. Examples of form factors include a traditional, plastic wallet-sized card, a small card adapted to be attached to key chain, radio frequency identification (RFID) card, mobile phone, etc. At least some of the account features specified by the feature data (123) are offered based on the form factor of the account identification device of the respective accounts (e.g., 133, 134). Thus, the account features (e.g., 127 and 128) are truly of value to both the account holders and the owners or issuers of the form factors.

In one embodiment, the integration of the delivery of account features (e.g., 127 and 128) with the transaction handler (103) includes the collection of data from multiple sources to derive intelligence, including the transaction data (109), the feature data (123), the feature usage data (121), and associated data from feature providers (e.g., 118) and other entities associated with the fulfillment of the services and/or products offered by the account features, such as vendors, administrators, customer service providers, suppliers, merchants, etc.

In one embodiment, integrations are performed at multiple different levels to offer account features in an individualistic (individual card level) manner. In one embodiment, the feature offer engine (113) performs data aggregation and filtering for recommending features and assigning features. In one embodiment, the feature data (123) includes a collection of information, such as services and/or products procurement inventory that can be used for the fulfillment of the benefits of the account features, form factor information, consumer segmentation/portfolio overlay data, etc.

In one embodiment, the feature offer engine (113) determines feature propensity scores based on the transaction patterns reflected in the transaction data (109), and the use the feature propensity scores to offer or award account features. In one embodiment, the aggregated spending (e.g., in an account, and/or in a category) is compared to a threshold to determine whether an account or an account holder is eligible for an account feature.

In one embodiment, the feature offer engine (113) is to identify and/or validate the links (e.g., 129) among accounts (e.g., 133 and 134) for feature sharing or householding.

In one embodiment, the feature offer engine (113) is to identify events, transactions, etc., that lead to further transactions to invoke the benefit of the account features (e.g., 127, 128), or that lead to loyalty benefits, or rewards. The notification engine (117) is to inform the respective account holders of the opportunity for the transactions and/or the loyalty benefit or rewards.

In one embodiment, the system illustrated in FIG. 1 uses the aggregated and/or filtered data for offer presentment, account holder enrollment, transaction qualification, notification to account holders, enhancements based on usage, and automatic "For Fee" transaction generation based on vendor "best offer."

In one embodiment, the system illustrated in FIG. 1 includes the transaction handler (103) recording the transaction data (109), the feature offer engine (113) to aggregate and filter data for account feature offers, a procurement engine (119) to organize feature providers (e.g., 118) and feature bidding, and the portal (143) and the notification engine (117) for feature presentation, servicing, customization, personalization, including a user interface to Build Your Own (BYO) feature set, as illustrated in FIGS. 3-7. In one embodiment, the system further includes a feature workflow engine to manage the benefit fulfillment of the account features (e.g., 127, 128).

In one embodiment, the feature offer engine (113) derives intelligence information from the data warehouse (149) for the fulfillment of the benefits of the account features, such as an automated linkage between the "trigger" transaction and a feature.

For example, in one embodiment, the applicable account feature is marketed via the notification engine (117) after a cardholder's purchase of a qualifying transaction. The qualifying transaction triggers One-on-One marketing to the cardholder for the appropriate "Feature."

Figure 2:
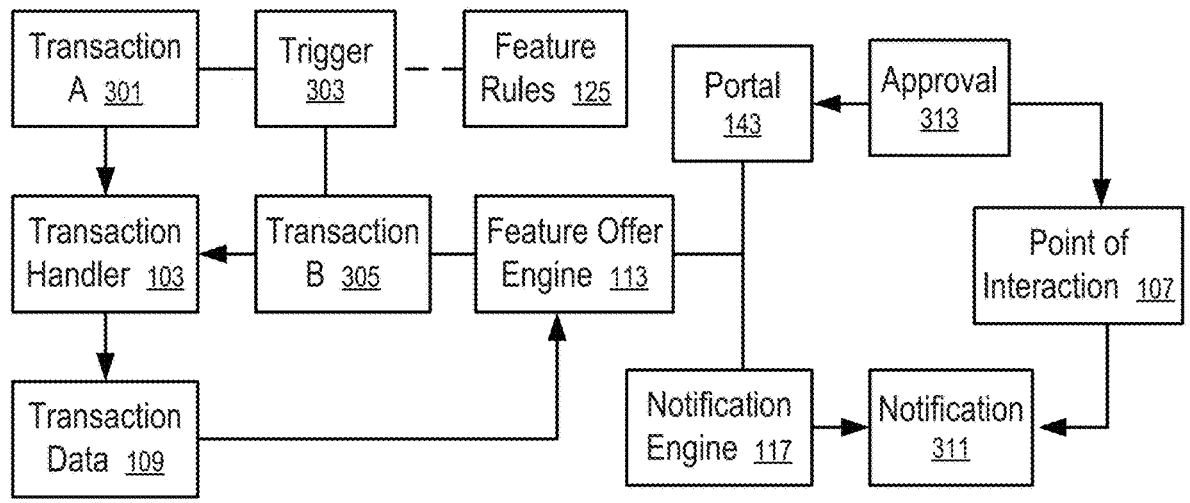
FIG. 2 shows a system to generate a transaction according to one embodiment.

FIG. 2 shows a system to generate a transaction according to one embodiment. In FIG. 2, the feature rules (125) are used to define the trigger (303) which is to generate transaction B (305) in response to transaction A (301) that meets the requirements of the trigger (303).

In one embodiment, the transaction handler (103) processes transaction A (301) and generates transaction data (109) about the transaction A (301), the feature offer engine (113) coupled to the data warehouse (149) and/or the transaction handler (103) is to detect transaction A (301) that satisfies the requirements of the trigger (303).

In one embodiment, in response to the detection of transaction A (301) that can trigger transaction B (305) in accordance with the feature rules, the feature offer engine (113) is to use the notification engine (117) and/or the portal (143) to notify the account holder and/or receive approval from the account holder.

For example, in one embodiment, the notification engine (117) is to transmit a notification message (311) about an offer associated with transaction B (305) to the point of interaction (107) of the account holder. The account holder may use the same point of interaction (107), or a different one, to provide the approval message (313) to the feature offer engine (113) via the portal (143).

In one embodiment, the feature offer engine (113) is to submit transaction B (305) to the transaction handler (103) upon receiving the approval message (313) from the account holder.

In some embodiments, the approval message (313) is not necessary for the feature offer engine (113) to initiate transaction B (305), such as when the account holder pre-approves such transactions in advance with a preference setting, or when the account holder does not provide a disapproval message within a predetermined period of time.

As an example, assume that the feature (e.g., 127) provides the benefit of a premium trip cancellation coverage at a discounted price. For example, the feature (e.g., 127) is to provide premium trip cancellation coverage at a discounted price (e.g., $35 instead of $50) for each airline ticket purchase transaction if the account holder adds the feature (e.g., 127) to the account (e.g., 133). The feature offer engine (113) is to use the account information and/or purchase history to determine or identify a particular account holder based on some predetermined criteria (e.g., account holders with an annual spend in the travel category of $30,000 who have also purchased at least one trip cancellation insurance within the last two years).

In one embodiment, if the feature (e.g., 127) is not already in account A (133) and the account holder of account A (133) is eligible for the feature (e.g., 127), the feature offer engine (113) is to market the feature (e.g., 127) to the account holder at the point of interaction (107). In one embodiment, the feature offer engine (113) is to offer the account holder to enroll or accept the feature (e.g., 127) via a communication in the form of an email with a hyper-link to register for the offer, a mobile message, a text message, a voice message, a direct mail with instructions to enroll, a website and the like.

In one embodiment, after the account holder enrolls in the program provided by the account feature (e.g., 127) (through a web portal (143), for example), each airline ticket purchase triggers (e.g., 303) an additional purchase transaction (e.g., 305) in the account (e.g., 133) is automatically generated for the price of the Premium Trip Cancellation Coverage (e.g., at the discounted price afforded by the account feature (e.g., 127)).

The notification engine (117) can use a one-way or two-way communication to market the additional purchase (e.g., 305) to the account holder and/or to allow the account holder to either decline or cancel the purchase. The notification of the optional purchase for the coverage (e.g., at the discounted price) provided under the feature (e.g., 127) is to be communicated to the targeted account holder via an email, a text/SMS message, a voice message, etc.

In one embodiment, the enrollment to the account feature (e.g., 127) in the account (e.g., 133) is to be in effect until being terminated by the account holder, or until the account holder is no longer eligible for the account feature (e.g., 127) in accordance with the feature rules (125). When the account feature (e.g., 127) is in effect for the account (e.g., 133), the Premium Trip Cancellation Coverage is to be purchased for each airline ticket paid using the account (e.g., 133).

In one embodiment, the account feature (e.g., 127) has an alert option, which when selected provides the respective account holder with an alert for the "For Fee" transaction triggered by a qualifying transaction in connection with the account feature (e.g., 127).

In one embodiment, the notification engine (117) provides a one-way alert to the account holder via an email, a text message, a voice message. The one-way alert is to notify the account holder that a qualifying transaction (e.g., purchase of an airline ticket) has occurred and the associated benefit (e.g., trip cancellation coverage) is to be provided for that travel arrangement. In addition, the one-way alert may also indicate that a "For Fee" enhancement transaction (e.g., $35 cancellation insurance) will be generated. The one-way alert may also provide contact information if the account holder wants to cancel the "For Fee" transaction.

In another embodiment, the notification engine (117) is to facilitate a two-way alert. The two-way alert can be used in several different ways. In one way, it can send a message to the account holder as described above and allow the account holder to approve the "For Fee" enhancement transaction prior to the transaction being performed. Ideally, this positive response can reduce the requirements for credit and exception processing related to the original purchase transaction. In another way, it can send a message to the account holder as described above and offer an upgrade of the purchased enhancement (e.g., higher travel insurance coverage) or additional related enhancements (e.g., airport lounge day pass).

In one example, the account feature (e.g., 127) is to provide a benefit via statement credits when the account holder makes a triggered transaction (e.g., 305) that is entitled to the benefit of the account feature (e.g., 127). For example, in one embodiment, the triggered transaction (e.g., 305) is the purchase of an airport lounge day pass; and the statement credits are provided to effectively reduce the price of the purchase, or to make the purchase effectively free of charge.

In one embodiment, the triggered transaction (e.g., 305) is in response to a triggering transaction (e.g., 301) when an aggregated spending threshold is satisfied. For example, in one embodiment, the spending threshold is satisfied when the account (e.g., 127) having the account feature (e.g., 127) is used to purchase a predetermined number of airline tickets, spend a predetermined amount of money in a period of time (e.g., a month or a year), and/or make a predetermined number of transactions in a category, such as a travel category that includes spending on airline, hotel, car rental, etc. For example, in one embodiment, the account feature (e.g., 127) offers the account holder a free airport lounge day pass when the corresponding account (e.g., 133) is used to purchase five airline tickets, or spend at least $5000 per month, or make twenty five travel transactions per month (for airline, hotel, or car rental). For example, the account feature (e.g., 127) offers the account holder two free airport lounge day passes when the account (e.g., 133) is used to purchase eight airline tickets In one embodiment, the triggering transaction is the transaction the addition of which causes the threshold to be met. In one embodiment, the triggering transaction is the transaction in a specific category, such as the purchase of an airline ticket, after the spending or loyalty threshold is satisfied. In one embodiment, the benefit of the account feature (e.g., 127) is provided as a loyalty program.

In one embodiment, the notification of the benefit of the triggered transaction (e.g., 305) is provided in response to the triggering transaction (109) being processed by the transaction handler (103). In one embodiment, the notification of the benefit of the triggered transaction (e.g., 305) is provided in response to the location of the account holder, after the triggering transaction (109) is processed by the transaction handler (103).

In one embodiment, the benefit provided to the triggered transaction (e.g., 305) is provided to the account holder via the statement credit after the transaction handler (103) processes the triggered transaction (305) using the account (e.g., 133). The transaction handler (103) or the feature offer engine (133) is to recognize the triggered transaction (e.g., 305) from the transaction data (109) and thus automatically communicate with the issuer processor (e.g., 145) to provide the statement credit. Thus, the account holder does not have to present a coupon or similar item to claim the benefit. This reduces burdens on the account holder and thus improves user experience. Alternatively or in combination, the notification engine (117) may provide an electronic coupon or discount code with the notification of the eligibility of the triggered transaction (305) for the benefit of the account feature (e.g., 127).

In one embodiment, the transaction handler (103) is to monitor transactions to detect the trigger (303). Alternatively, a separate engine, such as the feature offer engine (113), is configured to access the transaction data (109) over the network (101) to detect the trigger (303). For example, the transactions can be monitored in real time for airline ticket purchase transactions; and for those transactions, they can be further compared to the list of account holders or accounts that have enrolled in the enhancement feature (e.g., 127).

In some embodiments, triggers (e.g., 303) are detected periodically from settled transactions.

An alternate scenario is a non-transaction trigger associated with the payment form-factor, for example, as an overall valuable customer.

In one embodiment, the triggers are also detected for the notification of benefits of account features that do not require an additional "for-fee" transaction. For example, the notification of benefits is to inform the account holder of the earning of reward points, rebate cash, discount, etc., triggered by qualifying transactions under loyalty programs.

In one embodiment, the feature offer engine (113) is to selectively offer features based on a spending threshold and/or a type of spending. For example, when the aggregated spending in a period of time (e.g., previous 12 months) in account A (133) is above a threshold, or when the aggregated spending having the type of spending in the account (133) is above the threshold, the account (133) is offer the feature (127).

In one embodiment, if the spending requirement is not met, the feature (127) is to be removed from the account (133).

In one embodiment, the spending requirement can be checked and/or enforced periodically, or in real time in response to transactions that may qualify for benefits of the feature (e.g., 127).

Thus, the system as illustrated in FIG. 1 enables an individual account holder to be granted a suite of features that could differentiate them from another card account for the same product in the same BIN. The feature set can be changed dynamically based on the spending of the account holder, the preferences of the account holder, and/or the preferences of the issuer (e.g., 131).

In one embodiment, the spending threshold requirement is to further introduces the flexibility of feature eligibility and determination based on spending in individual account (e.g., 133), in household grouping (e.g., 129), or other types of grouping (e.g., a corporation, a circle of friends).

In one embodiment, qualifying criteria such as cumulative spending within a specified time period can be established for a type of spend within a merchant or merchant category group.

For example, in one embodiment, the feature rules (125) specifies the qualification of increased level of coverage for lost luggage reimbursement insurance if an account holder spends more then $35K in the past 12 months, or an Issuer promotes a feature as a reward for establishing bill payment for utilities.

In one embodiment, the feature offer engine (113) is to assign feature propensity score as individualistic rating of account features (e.g., 127, 128) by account or account holder. The feature propensity score enables a framework to evaluate different drivers of value relative to the other. For example comparing usage of particular services or features at a service provider with spending analysis and awareness of a feature. In one embodiment, the feature propensity score is a value ranking of a particular feature's value to an account holder, or likelihood of the account holder to purchase a feature, to make purchases under the feature, or to utilize the feature.

An example of a propensity score would be a score of 9 (on a scale of 0 to 10) for the likelihood that a particular account holder would purchase an airport lounge access. The score of 9 means there is a very high likelihood that the account holder would purchase such product.

In one embodiment, the propensity score is computed based at least in part on the transaction data (109) recorded for the respective account (e.g., 133, or 134).

In one embodiment, the feature offer engine (113) uses the propensity score to determine whether or not to offer the corresponding feature to an account holder.

In one embodiment, the data warehouse (149) includes a number of complementary data elements that would be used by the feature offer engine (113), the procurement engine (119), the notification engine (117), and/or the portal (143). Such data elements includes a list of generic enhancement or feature benefits available to specific portfolios and/or segments, demographic or physiographic segmentations of account holders, a list of suppliers of features that are qualified to be part of the feature provider network or the procurement engine to bid for providing the services or products for the fulfillment of the features, a list of form factors (e.g., types) of account identification devices (e.g., card, mobile device, contactless payment device such as RFID devices), and/or an array indicating the individual features, benefits or services specific to an account or an account holder.

In one embodiment, the feature offer engine (113) is to determine a feature offer set that identifies the recommended feature or features based on the outcome of the processing of feature rules (125) and available inventory according to feature data (123). The feature offers are provided to the respective account holders via various marketing channels, such as white spaces available on the point of interaction (107), as discussed in the section entitled "POINT OF INTERACTION."

In one embodiment, a network of approved feature providers (e.g., 118) or vendors are either a preferred suppliers of features or service providers and issuers. The procurement engine (119) is to communicate with the approved vendors to collect the feature data (123) about features (e.g., 127, 128) that can be offered to the account holders. In one embodiment, a workflow engine manages controlled usage, business process adherence, communication and approvals in connection with the features (e.g., 127, 128).

In one embodiment, the system illustrated in FIG. 1 uses the data warehouse (149) to provide a turnkey servicing solution for feature enrollment, billing, notification, customer relation management, and reporting.

In one embodiment, the portal (143) includes a Multi-channel communication and account holder facing portal (Design/Build Your Own BYO), within which features are presented, offered and/or managed in a way as illustrated in FIGS. 3-9.

Figure 3:

For example, in FIG. 3, the account holder (or a potential account holder) is provided with the interface (210) to select the reward program assigned to the account (e.g., 133). The interface (210) can be presented via a web server of the portal (143) and a web browser running on the point of interaction (107) of the account holder.

In one embodiment, a set of radio buttons (211) allows the account holder to select one of the reward programs; and the links (215) can be selected to view details of the reward programs. In some embodiments, the user is allowed to switch from one reward program to another for a particular account (e.g., 133) without have to change the account number. The account holder is to select the "continue" button (213) to save the selected reward option and to navigate to the next screen of options of account features, as illustrated in FIGS. 4-7.

Figure 4:

FIG. 4 illustrates an interface showing a set of core features that are provided to the account holder without additional cost.

Figure 5:

FIG. 5 illustrates an interface showing a list of packages that are conveniently grouped as packages for presentation to the account user. In one embodiment, the account holder is to select exact one package. In other embodiments, the account holder may select no package, or more than one package.

FIG. 6 illustrates an interface showing a set of features provided in one package. In one embodiment, the account holder has the option to select all the features in the package, or a subset of the features in the package.

FIG. 7 illustrates an interface showing additional list of features that the account holder may individually select.

In one embodiment, some of the features (e.g., 127, 128) require a fee for enrollment (e.g., a monthly fee, an annual fee, etc.); and some of the features (e.g., 127, 128) require a per usage fee (e.g., a per call fee, a daily fee for access, a fee per claim, etc.).

Figures 8, 9:
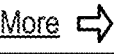

FIG. 8 illustrates an interface showing options to set up notifications. For example, the account holder may provide the email address, a mobile phone number and/or a phone number in entry boxes (221) to receive notifications related to the events selected by the option buttons (e.g., 223).

For example, in one embodiment, the account holder is to select the option button (223) to request a notification be sent to the phone number specified in the entry box (221) associated with the text message whenever a feature benefit is available to the account holder. The selected preferences of the account holder are stored in the data warehouse (149) for the notification engine (117).

FIG. 9 illustrates an interface that allows the account holder of one account (133) to request a householding link (e.g., 129) with another account (e.g., 134). For example, in FIG. 9, the account holder of account A (133) is to enter the account number of account B (134) in the entry box (225) to request the link (129).

In one embodiment, after the account holder of account A (133) requests the link (129), the account holder of the account B (134) is to provide a consent for the link (129) for householding via the portal (143) (or the notification engine (117)).

In one embodiment, after the feature offer engine (113) is to approve the request based on the feature rules (125). In one embodiment, the feature offer engine (113) is to automatically identify the candidate accounts that would qualify for householding links (e.g., 129) and offers the opportunity for establishing the householding links (e.g., 129) to the account holder.

In one embodiment, the portal (143) further provides support for feature queries, account holder queries, enrollment, servicing, to issues (e.g., 131, 132), the transaction handler (103), the feature providers (e.g., 118), etc.

Thus, in one embodiment, the portal (143) provides a 'Build Your Own'/'Design Your Own' mechanism to enable consumer directed selections of account features (e.g., enhancements, benefits, services), and feature attributes such as, amending coverage levels on their accounts, individually and collectively either by 'household' or entity in the case of a small business.

In one embodiment, the account holder can use the portal (143) to manage features by individual card account and 'household' grouping. Account holder selections may be by feature suites or package (e.g., FIG. 5), a la carte (e.g., FIG. 7) or combination there of (e.g., FIG. 6) and incur a fee which the can be debited directly from the account holder account by money or points.

In one embodiment, the account holder can use the portal (143) to tailor notification and alert options similar to targeted acceptance for feature reminders and offers based on transaction events (e.g., FIG. 8).

In one embodiment, the account holder can use portal (143) to request aggregation and/or sharing of account features for individual or householding of multicards (e.g., FIG. 9).

In one embodiment, the feature offer engine (113) is to determine qualifications for features (e.g., 127, 128) based on spending behavior, threshold qualification, and/or geographic card usage.

In one embodiment, the data warehouse (149) provides common services to a network of feature providers (e.g., 118), such as suppliers, vendors, program administrators, and/or issuers for procurement of account features, and associated services, claims tracking, account holder servicing, registration services (through self service or representatives), and integrated solutions with workflow.

In one embodiment, the system as illustrated in FIG. 1 enables business to business integrated billing of card feature provisioning and usage among issuers, suppliers and vendors, provides the ability for revenue share opportunities between Visa, vendors and issuers the with for fee account holder features, and provides a unified integration platform and database allowing issuers, service providers, suppliers vendors, third parties and account holders to utilize the features and functionality of the system.

One component of the system illustrated in FIG. 1 is a data identifying the features (e.g., 127, 128) of the accounts (e.g., 133 and 134) and their attributes such as effective dates and levels of coverage or value.

In one embodiment, the portal (143) provides interfaces (e.g., FIGS. 3-9) via Web UI or Web services to allow the account holder to design their own individual accounts (e.g., 133, 134) and select the features most relevant and applicable to them. The account holder selections are stored in the data warehouse (149) for lookup when servicing the account holder or by the feature offer engine (113) and/or the transaction handler (103) rules engine when monitoring for spending behavior, threshold qualification, or geographic card usage.

In one embodiment, the notification engine (117) uses the transaction triggers to provide notifications or alerts for up-sell and cross-sell opportunities, card feature reminders and reinforcement.

Additionally, merchant discounts could be offered based on the features (e.g., 127, 128) for the accounts (e.g., 133, 134) or aggregated for the 'household'.

In one embodiment, the "Design Your Own" account holder selections are stored in the data warehouse (149) and shared with issuer back office systems. Fees associated with feature selections are billed directly to the respective benefiting accounts via the transaction handler (103).

In one embodiment, issuers (e.g., 131, 132) are to administer account features (127, 128) through a self service module, and where appropriate integrated workflow will allow the review and approval of feature changes and registration. Suppliers, such as the feature provider (118), are to add features to the features data (123) through the procurement engine (119); and the system of FIG. 1 is to allow procurement and billing of features by issuers (e.g., 131, 132).

In one embodiment, the system of FIG. 1 is implemented using the transaction handler (103) and its infrastructure with interfaces to alerts, transaction network, web application user interface, web services and Card Maintenance File processing via various endpoints. Client side interfaces on the point of interaction (107) are implemented either through a common web service interface or client side software that enables seamless integration to web portals, online banking, customer servicing applications and related business back office applications to ensure optimized and up to date data management.

In one embodiment, the system of FIG. 1 allows issuers (e.g., 131,132) to offer additional enhancement features or benefits to individual account holders. In one embodiment, the account features (e.g., 127, 128) charge a per use fee, which is to be billed to the respective account (e.g., 133, 134) of the account holder, when a transaction has been made for which the benefit qualifies. For example, when an eligible account holder purchases an airline ticket using account A (133), possibly during a specified time period, a benefit such as Travel Accident Insurance for up to $1.5M can be offered in accordance with the feature X (127). In one embodiment, an account feature (e.g., 127) can provide variable options and pricing.

The following are additional examples of the types of transactions for which benefits may be offered in accordance with some account features in some embodiments.

A. Activation Rewards/Benefits: The account holder utilizes card for the first time and receives an additional benefit or incremental benefit, where fee may or may not apply.

B. Annual Spend Rewards: The issuer automatically upgrades account holder benefits when an annual spend threshold is surpassed. A fee may or may not be applied once the account holder's benefits have been upgraded.

C. Travel Transaction Benefits/Rewards: Based on airline ticket purchases, or car rental purchases an upgraded insurance or service based benefit is offered.

D. Protection Benefits/Rewards: Based on international travel, an additional benefit is awarded such as wallet protection, card replacement. Based on frequency in retail spending, an additional benefit, or upgraded benefit is provided, such as protection against identity theft, fraud monitoring, etc.

E. Merchant Loyalty: The account holder is awarded an additional merchant benefit based on frequent shopping at the merchant.

F. Account Holder Anniversary Benefits/Rewards: An issuer provides account holder an additional benefit (such as an offer, coupon, or points) on anniversary of first transaction or other identifiable milestone.

In one embodiment, a transaction triggered enhancement/benefit is provided according to an account feature (e.g., 127 or 128) on a per-account basis. In one embodiment, the feature data (123) includes a benefits database that stores the details of each benefit to be offered to the account holders. The feature usage data (121) includes a benefits database that stores actual benefits that have been purchased by or provided to the account holders. In one embodiment, the feature offer engine manages the benefits.

In one embodiment, issuer computers are to define eligible accounts (e.g., 133, 134) and send the data identifying the eligible accounts to data warehouse (149) (e.g., via the portal (143)) as a CMF (cardholder maintenance file) along with any rules (e.g., 125) that define criteria/rules for trigger.

For example, the eligible accounts may have been determined by the issuer to include only those that have an annual spend in a travel category of more than $50,000; an example rule and trigger may be the purchase of any airline ticket during a specified time period in order to offer a discounted offering of lost luggage insurance. Alternatively, rules that define the criteria for transaction trigger may be provided by the transaction handler (103).

In one embodiment, account holder contact information is sent to an alert & approve system, such as the notification engine (117) and the portal (143). The transaction handler (103) or the feature offer engine (113) is to determine qualified transactions using the feature rules (125). In particular, the transaction handler (103) or the feature offer engine (113) is to review the transactions that have taken place and look for those that qualify under the feature rules for a transaction trigger (e.g., purchase of airline ticket during the specified time period by an account contained in the eligible accounts list).

In one embodiment, the transaction handler (103) or the feature offer engine (113) sends information about those qualified transactions to the account holders via the notification engine (117) and/or the portal (143).

In one embodiment, the notification engine (117) and/or the portal (143) are to track the responses from the respective account holders.

The communications about the qualified transactions can be a one-way notification or a two-way communication. The one-way notification is generally for those benefits for which the account holders have already given consent to in advance. The two-way communication is generally for those that require an explicit approval from the account holders. The communication can be an email, text message to a mobile phone or a telephone call by an interactive voice response (IVR) system which is capable of interacting with the user and receiving user responses through the telephone.

In one embodiment, an example message sent to the account holder who had previously given permission to receive promotional offers is "You have made a purchase that is eligible for Sign and Travel Benefit. To activate the Benefit reply back with code '54367'." In one embodiment, the message is transmitted to a mobile phone of the account holder, which can reply to the message via short message service (SMS) to make the purchase. In one embodiment, the account holder can also purchase the particular benefit offered by clicking on an "Activate" link provided in the message. The clicking brings the account holder to a page maintained by the web portal (143), where the details of the benefits can be explained and the benefit purchased. In one embodiment, the account holder can call the voice portal (143) of the system illustrated in FIG. 1 to make the purchase, via an IVR system, or a representative.

In one embodiment, the portal (143) and/or the notification engine (117) is to send approved transactions to the respective issuer processor (145), which then sends the data to the transaction handler (103) for fee billing to the account holders. In one embodiment, the portal (143) and/or the notification engine (117) is generate the approved transactions and use the transaction handler (103) process the account holder approved transactions.

In one embodiment, the portal (143) and/or the notification engine (117) is to record the account holder approved transactions in the data warehouse (149) to generate the feature usage data (121) to indicate that the particular benefits have been approved by the account holders.

In one embodiment, the details of benefits offered to account holders are stored in the data warehouse and are managed through a user interface within the system illustrated in FIG. 1.

In one embodiment, an account holder can access the details of the benefits via the portal (143) using the point of interaction (107).

In one embodiment, an issuer (e.g., 131 or 132) ora feature provider (e.g., 118) can also access the relevant details of the benefits afforded according to the respective account features (e.g., 127, 128).

For example, in one embodiment, an issuer is to use the interface via the portal (143) to specify whether an account feature, such as "Sign and Travel Benefit Suite", is to be funded by the operator of the transaction handler (103), the issuer, or the respective account holder.

In one embodiment, the issuer can use the portal (143) to specify the "Start Date" and "End Date" to define the benefits offer promotion period.

In one embodiment, the issuer can use the portal (143) to select a supplier, a service provider, and a broker, etc. for the fulfillment of the services or products offered as the benefit of the account features. In one embodiment, the procurement engine (119) generates the feature data (123) to provide valid candidates for selection by the issuer.

In one embodiment, the issuer may select a billing option from a list of candidates, such as per transaction, per statement, per phone call, per debit, per account, etc.

In one embodiment, the feature provider (118) is to communicate with the data warehouse (149) via the portal (143) to manage the features/benefits that have been assigned to and purchased by the account holders. The user interface for the feature provider (118) can be a web based user interface that can be accessed by the feature provider (118) through a communication network such as the Internet. Alternatively, a user interface can be provided to the feature provider (118) which is capable of accessing a relevant portion of the data warehouse (149). Through the user interface, the feature provider (118) can handle account holder inquiry as to whether a particular benefit has been assigned or purchased for that account holder and as to any fee dispute. In one embodiment, the user interface for the feature provider (118) includes a link, an icon button, or another user interface element, which when selected, provides a view of benefits usage history associated with an account feature (e.g., 127 or 128). The feature provider (118) may use the interface to initiate a refund for any particular fee charged. Similar user interfaces for accessing the usage details can also be provided to the issuer and/or the account holder via the portal (143).

Figure 10:
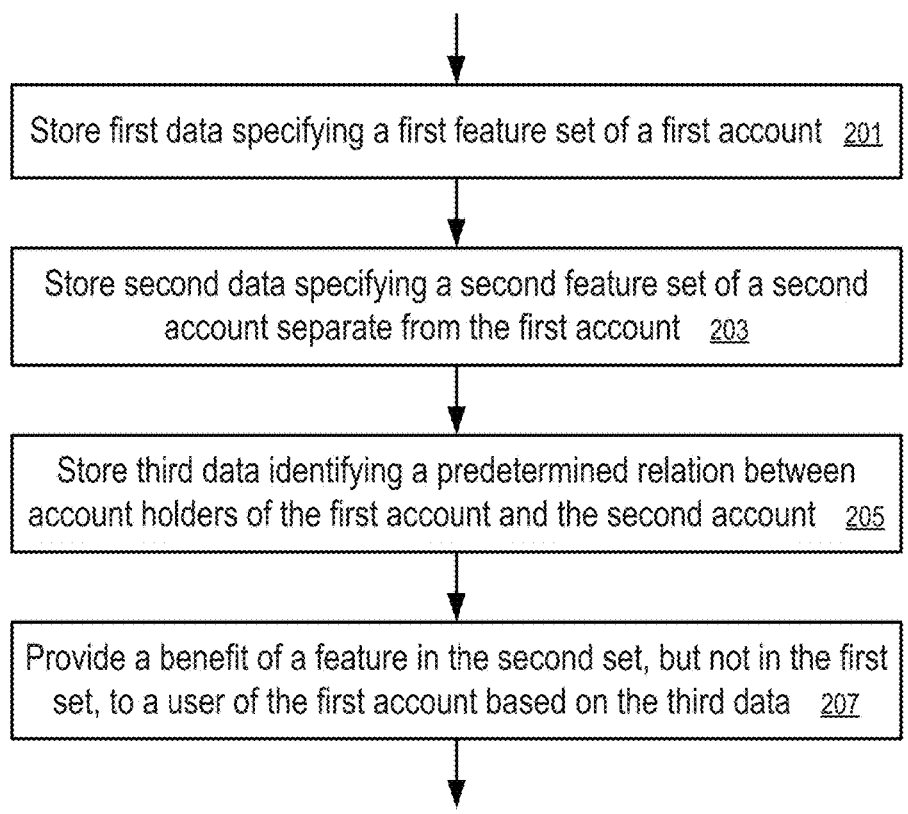
FIG. 10 shows a method to provide the benefit of an account feature according to one embodiment.

FIG. 10 shows a method to provide the benefit of an account feature according to one embodiment. In FIG. 10, the data warehouse (149) is to store (201) first data specifying a first feature set of a first account (e.g., 133), store (203) second data specifying a second feature set of a second account (e.g., 134) separate from the first account, and store (205) third data (e.g., 129) identifying a predetermined relation between account holders of the first account and the second account. The feature offer engine (113) is to provide (207) a benefit of a feature (128) in the second set, but not in the first set, to a user of the first account (133) based on the third data (e.g. 129).

In one embodiment, a computing apparatus for householding includes at least one of: the data warehouse (149), the feature offer engine (113), the notification engine (117), the procurement engine (119), the transaction handler (103), and the portal (143).

In one embodiment, the computing apparatus is to store account data (e.g., 133, 134) identifying account features (e.g., 127, 128) of a plurality of separate payment accounts, receive data identifying a first payment account (e.g., 133) which does not have an account feature (e.g., 128), identify at least one second payment account (e.g., 134) that is related to the first payment account (e.g., 133), and determine whether a user of the first payment account (e.g., 133) is eligible for a benefit of the account feature (e.g., 128) based on whether the account data indicates that the at least one second payment account (e.g., 134) has the account feature (e.g., 128).

In one embodiment, the first payment account (e.g., 133) is linked to the at least one second payment account (e.g., 134) via householding link (e.g., 129) to indicate that the account holders of these accounts are in the same household or family. The benefit of the account feature includes one of: discount, incentive, reward, gift, access, insurance, service and cash back.

In one embodiment, the computing apparatus is to store link data (e.g., 129) to link the first payment account (e.g., 133) to the second payment account (134) in response to a request from an account holder and to store a set of rules (e.g., 125) to link accounts. The computing apparatus is to identify the at least one second payment account (e.g., 134) based on the link data and/or the rules.

For example, in one embodiment, the computing apparatus is to match information about the first payment account (e.g., 133) and information about the second payment account (e.g., 134) to determine whether the first payment account (e.g., 133) and the second payment account (e.g., 134) satisfy the set of rules (e.g., 125) to be linked.

In one embodiment, the computing apparatus is to receive feature selection data (as illustrated in FIGS. 3-7) for a third payment account having a feature set same as at least fourth payment account and to modify the account data in accordance with the feature selection data, to change feature specification of the third payment account without affecting feature specifications of the at least fourth payment account. The features specified for an individual account, instead of a group of accounts sharing a common portion of their account numbers.

In one embodiment, the feature selection data can be received from an entity such as an account holder of the third payment account, an issuer of the third payment account, or a representative of the issuer or transaction handler.

In one embodiment, householding is permitted when the first payment account (e.g., 133) and the second payment account (e.g., 134) are provided by a same issuer (e.g., when the account feature is sponsored by the issuer).

In one embodiment, householding is permitted when the first payment account (e.g., 133) and the second payment account (e.g., 134) are different (e.g., when the account feature is sponsored by the transaction handler (103), the account holder, and/or the feature provider (118) other than the issuers).

In one embodiment, householding is permitted when the first payment account (e.g., 133) and the second payment account (e.g., 134) are different. For example, the account feature (128) of the second payment account (134) is sponsored by the second issuer (e.g., 132); and when a transaction initiated using the first account (e.g., 133) is processed at the transaction handler (103) and determined to qualify for the feature (e.g., 128) through householding, the transaction handler (103) is to complete the transaction using the second payment account (e.g., 134).

In one embodiment, when a transaction initiated using the first account (e.g., 133) is processed at the transaction handler (103) and determined to qualify for the feature (e.g., 128) through householding, the transaction handler (103) is to complete the transaction using the first payment account (e.g., 133) and to charge a fee for the benefit to the second payment account (e.g., 134) (e.g., when the feature (e.g., 128) is funded by the account holder).

In one embodiment, the identifying of the at least one second payment account (e.g., 134) is in response to a transaction that was initiated using the first payment account (133) and that qualifies for the benefit of the account feature (e.g., 128).

In one embodiment, the benefit of the account feature (e.g., 128) includes a reward; and the benefit is accumulated under the first payment account (e.g., 133) separately from the second payment account (e.g., 134), even though the first payment account (e.g., 133) is eligible for the account feature (e.g., 128) only via the benefit of householding link (129) with the second payment account (e.g., 134). Alternatively, the benefit resulted from the transactions in the first payment account (e.g., 133) are accumulated in the second payment account (e.g., 134) when the benefit is provided based on the householding link (129) and the account feature (e.g., 128) of the second payment account (e.g., 134).

Figure 11:
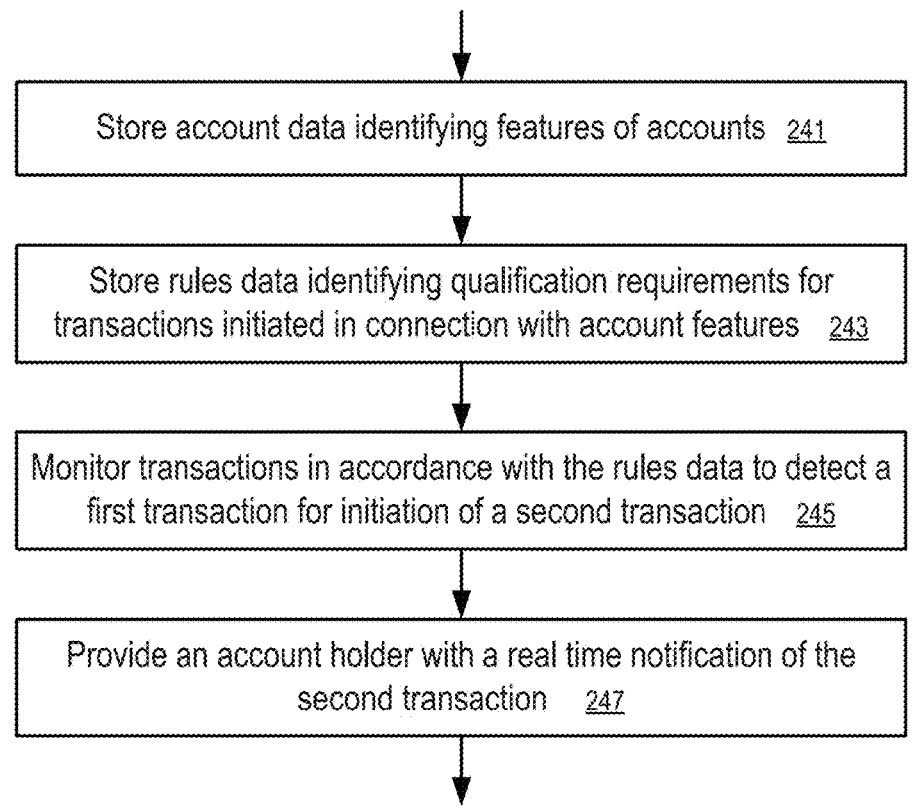
FIG. 11 shows a method to trigger a transaction according to one embodiment.

FIG. 11 shows a method to trigger a transaction according to one embodiment. In FIG. 11, the data warehouse is to store (241) account data identifying features of accounts (e.g., 133, 134) and store (243) rules data (e.g., 125) identifying qualification requirements for transactions (e.g., 305) initiated in connection with account features (e.g., 127, 128). The feature offer engine (113) is to monitor (245) transactions (e.g., 301) in accordance with the rules data (e.g., 125) to detect a first transaction (e.g., 301) for initiation of a second transaction (e.g., 305). The notification engine (117) is to provide (247) an account holder with a real time notification of the second transaction (e.g., 305).

In one embodiment, a computing apparatus for triggering account feature related transactions includes at least one of: the data warehouse (149), the feature offer engine (113), the notification engine (117), the procurement engine (119), the transaction handler (103), and the portal (143).

In one embodiment, the computing apparatus is to store account data identifying at least one account feature (127) of an account (133) to provide a benefit to an account holder of the account (133), store rules data (e.g., 125) identifying at least one qualification requirement associated with identification of transactions that qualify for the benefit of the account feature (127), monitor transactions (e.g., 301) in the account (133) using the rules data (e.g., 125) to identify a first transaction (301) that qualifies for the benefit of the account feature (127), and provide the account holder with a notification (311) of a second transaction (305) to be generated according to the account feature (127), prior to the generation of the second transaction (305).

In one embodiment, the computing apparatus is to further receive an approval (313) of the second transaction (305), prior to the generation of the second transaction (305).

In one embodiment, the second transaction (305) is to pay for a product or service afforded by the account feature (127); and the benefit may be a discount in a price of the product or service and/or a privilege to access the product or service.

In one embodiment, the notification (311) is provided in real time with authorization processing of the first transaction (301), or in response to settlement of the first transaction (301). In one embodiment, the notification (311) is provided via a text message to a mobile phone of the account holder, an email and/or a voice message.

In one embodiment, the computing apparatus is to identify a second account feature based on a third transaction in the account (133) and to offer, in real time with the processing of the third transaction, the account holder to purchase the second account feature. In one embodiment, the offer is provided via a notification via email, text message and/or voice message.

In one embodiment, the computing apparatus is to store transaction data (109) recording transactions in the account (133) and use the transaction data (109) to identify the second account feature. For example, in one embodiment, the computing apparatus is to determine a propensity score of the second account feature based on the transaction data and offer the second account feature when the propensity score is above a threshold. For example, in one embodiment, the computing apparatus is to determine an aggregated spending amount based on the transaction data and offer the second account feature when the aggregated spending amount is above a threshold. The aggregated spending amount is based on transactions of a particular type in the account in one embodiment, and based on all transactions in a period of time regardless of the type of the transactions in another embodiment.

In one embodiment, the determination of whether or not to offer the second account feature to the respective account holder is further based on the aggregated spending profile of the account. In one embodiment, the transaction data (109) is used to determine the characteristics of transaction patterns of customers, which are profiled via clusters, factors, and/or categories of purchases. Details about aggregated spending profile and its use to target offers in one embodiment are provided in U.S. patent application Ser. No. 12/777,173, filed May 10, 2010 and entitled "Systems and Methods to Summarize Transaction Data," the disclosure of which is hereby incorporated herein by reference.

In one embodiment, the computing apparatus is to receive from the account holder a confirmation to purchase the second account feature, charge the account a price for the second account feature, and update the account data to include the second account feature. In one embodiment, the account data is updated to include the second account feature without changing the account number of the account (133).

Figure 12:
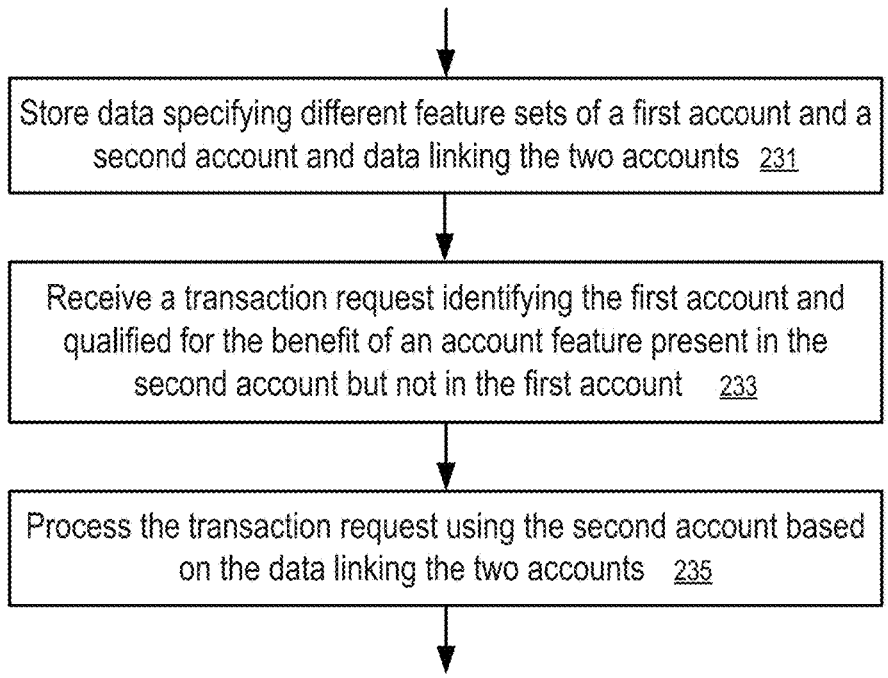
FIG. 12 shows a method to process a transaction according to one embodiment.

FIG. 12 shows a method to process a transaction according to one embodiment. In FIG. 12, the computing apparatus is to store (231) data specifying different feature sets of a first account (e.g., 133) and a second account (e.g., 134) and data (129) linking the two accounts, receive (233) a transaction request identifying the first account (e.g., 133) and qualified for the benefit of an account feature (e.g., 128) present in the second account (e.g., 134) but not in the first account (e.g., 133), and process (235) the transaction request using the second account (e.g., 134) based on the data (129) linking the two accounts (e.g., 133 and 134).

Figure 13:
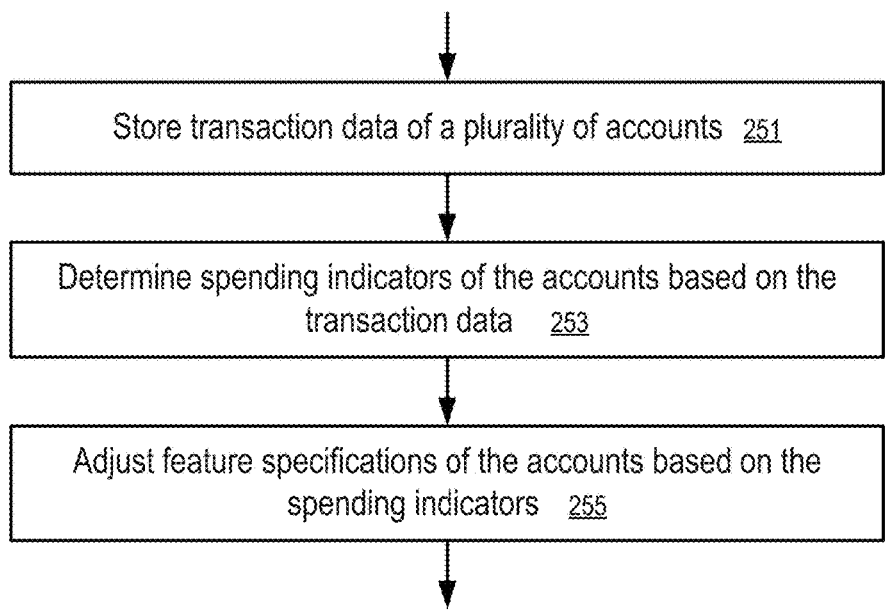
FIG. 13 shows a method to adjust account features according to one embodiment.

FIG. 13 shows a method to adjust account features according to one embodiment. In FIG. 13, the computing apparatus is to store (251) transaction data (109) of a plurality of accounts (e.g., 133, 134), determine (253) spending indicators of the accounts based on the transaction data, and to adjust (255) feature specifications of the accounts (e.g., 133, 134) based on the spending indicators, such as aggregated spending amount in a period of time, spending frequency or amount in a category or type, feature propensity score computed based on transaction data (109), etc.

API

Figure 18:
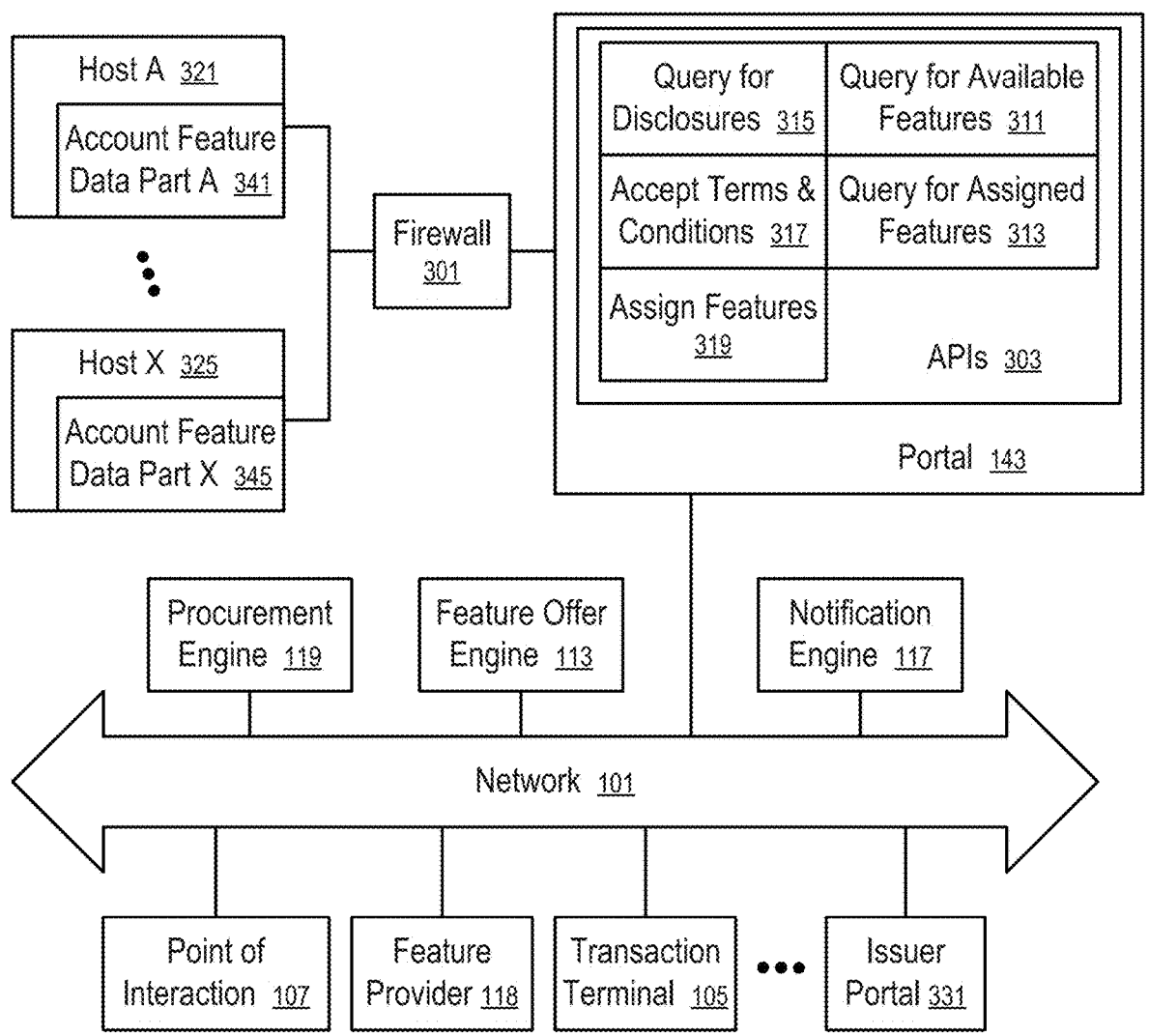
FIG. 18 illustrates a system to provide access to account feature data via API according to one embodiment.

FIG. 18 illustrates a system to provide access to account feature data via API according to one embodiment.

In FIG. 18, the portal (143) is configured as a centralized access point of the account feature data (341-345) that allows different entities involved in the account features to create applications using a set of APIs (303) configured on the portal (143).

For example, an issuer may provide an issuer portal (331) that is configured to use the APIs (303) to selectively present account features to an existing account holder or a potential account holder, to enroll the account holder in the respective account features for a fee, as a reward, or as an incentive to use the accounts issued by the issuer.

For example, a feature provider (118) may include an application configured to verify the eligibility of a particular account holder to receive the services and/or products relevant to the account feature provided by the feature provider (118).

For example, a call center that provides customer services to the account holders may include an application configured to present account feature data relevant to a particular account holder to a service representative to allow the service representative to help the account holder.

In one embodiment, the APIs (303) include a web service configured to allow a client application to query (311) the portal (143) for account features available to a account holder. In one embodiment, using the API to query (311) for available account features allows the client application to specify a set of parameters to identify a customer segment, or a particular customer, and receive data identifying account features that are available for assigning to customers in the segment, or the particular customer. For example, in one embodiment, the client application may use a registration ID to identify a particular customer and to use the API to query (311) the portal (143) for available account features that can be assigned to the particular customer. For example, in one embodiment, the client application may use a category, type or subtype of consumer accounts (e.g., 146) to identify customer segments to query (311) for available account features. Issuers may use the query results to manage portfolios at the account level.

In one embodiment, the APIs (303) include a web service configured to allow a client application to query (313) the portal (143) for account features assigned to an account holder. In one embodiment, using the API to query (311) for assigned account features allows the client application to identify a consumer account (146) and a specific date and to receive data identifying account features that have been assigned to the consumer account (146) as of the specific date. If the specific date is before the account opening date of the consumer account (146) and the consumer account (146) has a predecessor (e.g., an account closed in favor the consumer account (146), due to a lost or stolen card or other reasons), the account feature of the predecessor is identified and provided in the response (without the requesting application having to resubmitting a request for the predecessor). In one embodiment, use of the API to query (311) for assigned account features is accessible to issuers, feature providers and brokers. In one embodiment, a response from the API to a query (311) for assigned account features includes the identification of the type of feature assigned to the specific account, the coverage to which the account holder is entitled, the funding source of the account feature, the provider of the account feature, the effective date of the account feature for the specific account, contact information for assistance regarding the account feature, etc. In one embodiment, a response from the API to a query (311) for assigned account feature may optionally include a response level indication. For example, in one embodiment, when the response level is low, information about hours of operation of the respective feature provider is not provided in the response; and when the response level is high, information about hours of operation of the respective feature provider is provided in the response.

In one embodiment, the APIs (303) include a web service configured to allow a client application to query (315) the portal (143) for disclosure materials of an account feature or a feature set. In one embodiment, using the API to query (311) for disclosures allows the client application to identify an account feature, an account feature set, or a registration ID (identifying a session of registration for account features for a particular user) and to receive data representing the legal and/or marketing discloses of the account feature, or feature set. In one embodiment, use of the API to query (311) for assigned account features is accessible to issuers, feature providers and brokers.

In one embodiment, the APIs (303) include a web service configured to allow a client application to request the portal (143) to record account holder acceptance (317) of terms and conditions of a specific feature or feature set, which can be used by issuers to request the portal (143) to track the account holder acceptance (317) and acknowledgement of terms and conditions.

In one embodiment, the APIs (303) include a web service configured to allow an issuer to register the assignment (319) of an account feature or feature set to a specific account. In one embodiment, to successfully associate an account feature or feature set to a specific account, the account holder is required to complete the pre-enrollment for the account feature or feature set, which includes accepting the terms and conditions of the account feature or feature set. In one embodiment, the API configured to assign (319) an account feature can also be used to update the assignment status of an account feature or feature set for the specific account. The status update may be activating the association between the account feature (or feature set) and the specific account, or deactivating the association between the account feature (or feature set) and the specific account.

In one embodiment, web services are provided to implement the APIs (303), which allow real-time presentation and selection of benefit bundles by cardholders through the issuer's online banking site. The web services return a broad range of data elements that can be filtered and enhanced before being displayed to customers. In one embodiment, the web services are independent of each other; and thus issuers can create unique implementations to provide services to their account holders (or potential account holders).

In one embodiment, after a client application sends a request message to the portal (143), in accordance with one of the APIs (303) and using a Secure Socket Layer (SSL) channel over the network (101), the portal (143) is configured to authenticate the requesting system, verifying that the request message is from a system authorized to receive the requested data; and if the requesting system is authorized to receive the requested data, the portal (143) sends a response message containing the requested data. Based on the response received from the portal (143), the client applicant can present data to the respective user of the client application via a user interface.

In one embodiment, the portal (143) is configured to record the accesses to account feature data via the APIs (303). For example, the portal (143) records at least part of the information submitted for a particular data request made via the APIs (303), where the submitted information includes:

Timestamp: a time of the request (e.g., the time the client application generated the request, the time the request is received by the portal (143), the time a response to the request is provided by the portal (143));

Application ID: the name of the client application;

Request ID: A unique identifier string generated by the client application to represent the request;

User ID: an identifier of the requesting user or system. In one embodiment, the portal (143) is configured to perform entitlement and authorization checks based on the User ID. For example, the portal (143) determines whether the requesting user or system is entitled to the data requested via the APIs (303) and authorized to use the APIs (303), prior to accepting and/or responding to the request; and Audit User ID: an identifier of the human who made the request.

In one embodiment, the portal (143) stores auditable records to track accesses to the account feature data. Records of data access activities are associated with identifiers of the client applications/systems/computers that submitted the requests, the identifiers of the human users who made the requests, and the timestamps of the requests.

In one embodiment, the responses to the requests received in the portal (143) via the APIs (303) are based at least in part on the identity of the requesting client application, and/or the identity of the human users who made the respective request (and thus will be the ultimate consumer of the data provided as a response to the respective request). In one embodiment, the portal (143) stores a set of entitlement and authorization data that identifies the scope of access by various requesting client applications/systems/computing devices and/or the human users who made the respective request. In one embodiment, the portal (143) filters a response based on the set of entitlement and authorization data, based on the identities of the human requesters and/or the identities of the machine requesters. In one embodiment, the portal (143) is configured to use the set of entitlement and authorization data to determine/select the data items to be included in the responses. Thus, different responses may be provided to different requesting parties (i.e., the combination of the requesting machine and the requesting human) in response to the same query about a particular account and/or account feature, in view of different entitlement and authorization privileges.

In one embodiment, different portions of the account feature data (341-345) are stored on different hosts (321-325). Each of the hosts (321-325) is a separate computing device behind the firewall (301), separately controlling the access to the respective portions of the account feature data (341-345) hosted on the respective hosts (321-325). Thus, the security of the account feature data (341-345) is improved.

White Label

In one embodiment, the portal (143) is configured to allow users of consumer accounts (146) to access a set of user interfaces to access the account features in the respective consumer accounts (146) and/or purchase additional account features. The users access the user interfaces via the websites of the respective issuers of the consumer accounts (146).

For example, after a user signs in the website of the issuer of the consumer account (146) of the user, the user may select a user interface to visit the portal (143) that presents the user interfaces.

When the user is referred to the portal (143) by the website of the issuer of the consumer account (146) issued to the user, the identity of the issuer is used to generate a customized presentation of the user interfaces. The portal (143) is configured to use configurable white label resources and/or custom HTML code specified for the issuer to customize the user interfaces for the user associated with the issuer.

In one embodiment, a common controller and model layer of the portal (143) is configured to process the information access and generation of the content to be presented. Different presentation layers are configured with different white label resources to customize the presentation of the user interface.

In one embodiment, separately deployable servlet instances are used to combine the common controller and model layer and the customized presentation layers for the users of the respective issuers.

In one embodiment, white label resources can be customized without additional development to customize the user interfaces for the respective issuers. Examples of such white label resources include issuer logos, custom labels, and text areas, links back to specific client pages, etc.

In one embodiment, to facilitate greater customization, the entire presentation layer can be modified as a development project, to provide Look, Tone and Feel (LTF), style sheets, html, and zones customized by an issuer. The customization can include the addition of new user interface elements, providing a level of customization permitted within a predetermined set of parameters, but without the security vulnerability of unvalidated, uploaded HTML.

In one embodiment, a base presentation layer is provided by the portal (143) to implement one or more baseline customization levels, to the extent they can be implemented with resource white labeling (e.g., without customized uploaded HTML code). A custom presentation layer can be used to implement customization that cannot be addressed with white label resources.

FIGS. 19 through 33 illustrate user interfaces configured to facilitate the acquisition of account features according to one embodiment.

FIG. 19 illustrates a website of an issuer that presents issuer content related to the consumer account (146) issued to the user of the consumer account (146). The website verifies the identity of the user, before presenting the issuer content to the user. The website contains one or more links (401) configured to refer the user to the portal (143) in a secure way. When the link (401) is selected, the web browser of the user is redirected to the portal (143) that presents a user interface customized based on the identity of the issuer and/or the user.

In one embodiment, a link (401) is presented in the section of account details of a specific consumer account (e.g., credit card ( . . . 5678) in FIG. 19). When such a link (401) is selected, the link (401) forwards the user to the portal (143) for account features specific to the consumer account (e.g., credit card ( . . . 5678) in FIG. 19).

In one embodiment, a link (401) is presented in a section independent of specific consumer accounts. When such a link (401) is selected, the user is referred to the portal (143) for account features of the set of consumer accounts issued by the issuer to the user. The portal (143) can be configured to allow the user to select a specific consumer account for managing account features, or manage the account features for the entire set of consumer accounts as a whole.

For example, when a link (401) is selected in the issuer site, the web browser of the user can be referred to the portal (143) for a user interface illustrated in FIG. 20.

FIG. 20 illustrates a user interface with customized white label according to one embodiment. In FIG. 20, the user interface includes a user interface element (403) that when selected directs the web browser of the user back to the website of the issuer (e.g., as illustrated in FIG. 19).

Further, the user interface illustrated in FIG. 20, includes a logo (405) customized for the issuer and account information (407) specific to the consumer account (146) of the user. Different issuers may specify different logos and/or other white label resources to customize the appearance of the user interface; and an identifier of the user passing from the website of the issuer is used to retrieve the account information (142) of the user and present the feature data (123) of the account features associated with the consumer account (146) of the user.

In one embodiment, the portal (143) is configured to authenticate the user based on a parameter passed from the issuer site to portal (143) via the link (401). Thus, the portal (143) can automatically authenticate the user, based on the authentication performed by the issuer site and the parameter received from the issuer site via the link (401). The user does not have to provide another set of credential to sign in the portal (143) to access account feature information of the user.

Alternatively, the portal (143) may separately authenticate the user independent from the issuer site. For example, the portal (143) may require the user to present a user name and a password to sign in the portal (143) for accessing the account features of the consumer account of the user.

In FIG. 20, the user interface further includes a section to provide a summary of alerts and/or messages to the user. Various information related to the account features, such as disclosure information, notification of changes, call for actions, can be communicated to the user via alerts and messages provided via the web interface.

In FIG. 20, the user interface presents a concise overview/summary (411) of the account features associated with the consumer account (146) of the user. The user interface further includes a user interface element (409) selectable to request a further user interface to shop for additional account features, and a user interface element (413) selectable to request a further user interface to access details of the account features (account benefits).

In FIG. 20, the user interface includes links to other portions of the website hosted on the portal (143), such as a section providing information regarding "How it Works", a section providing frequently asked questions and answers, a section providing contact information of representatives of the portal (143), a section providing a user interface to manage account information of the user for the site, and section providing a user interface to view messages delivered to the inbox of the user in the site.

For example, when the link "How it Works" is selected, a user interface illustrated in FIG. 29 is presented to explain how the site works to manage account features.

Figure 30:

For example, when the link "FAQ" is selected, a user interface illustrated in FIG. 30 is presented to show frequently asked questions and answer related to the portal for managing account features.

Figure 31:
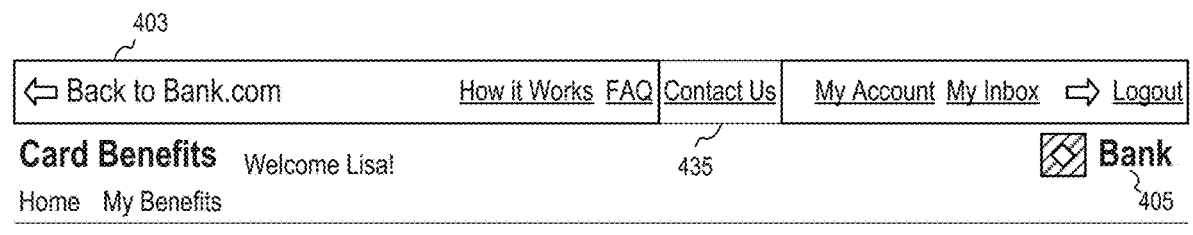

For example, when the link "Contact Us" is selected, a user interface illustrated in FIG. 31 is presented to show contact information of representatives of the portal.

Figure 32:
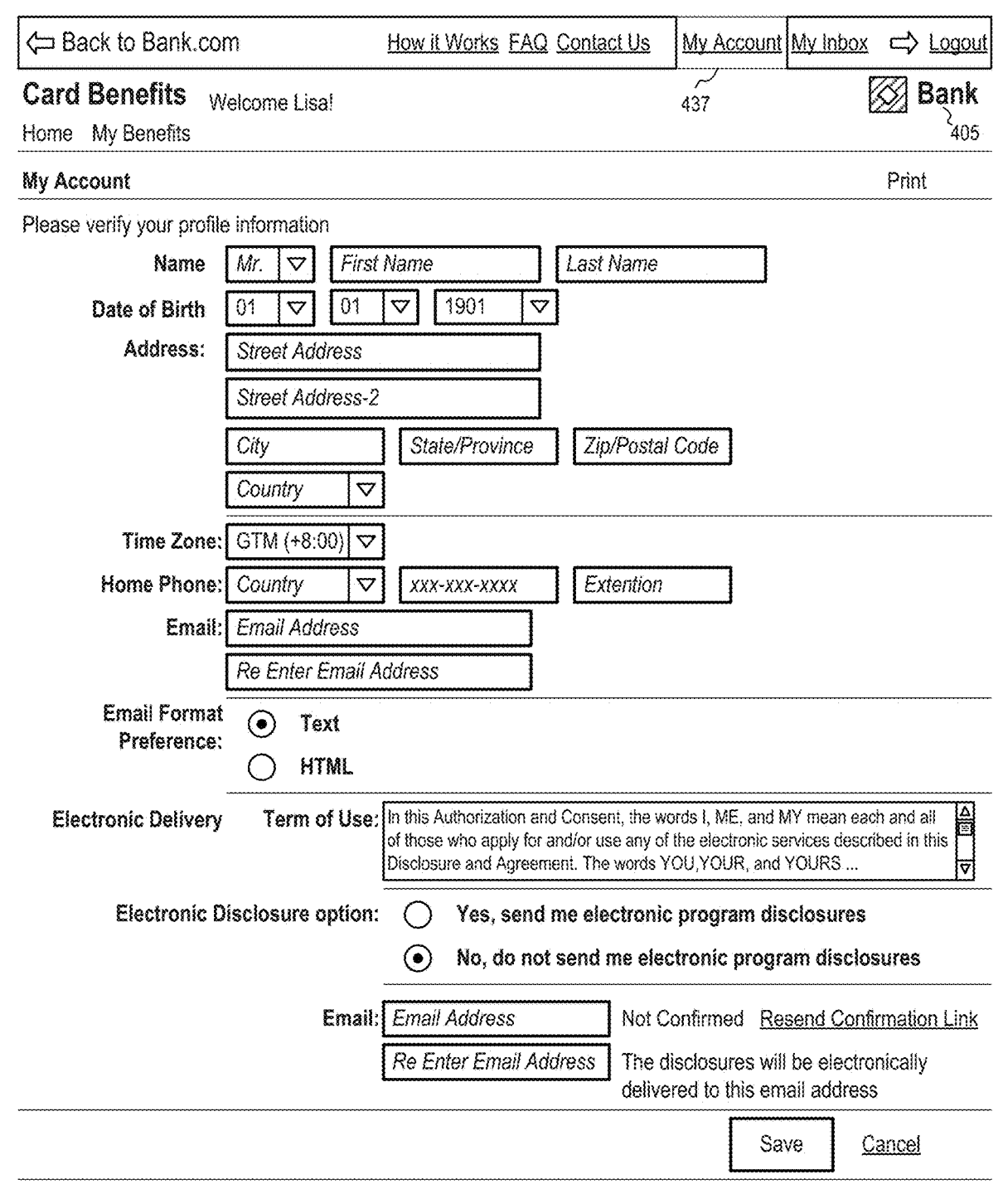

For example, when the link "My Account" is selected, a user interface illustrated in FIG. 32 is presented for managing account information of the user for the site For example, when the link "Inbox" is selected, a user interface illustrated in FIG. 33 is presented for the messages delivered to the inbox of the user in the site.

Figure 21:

In FIG. 20, when the user selects the link (413) to view full list of current benefits (or the user interface element labeled as "My Benefits"), the portal (143) is configured to present a user interface illustrated in FIG. 21.

FIG. 21 illustrates a user interface when the user interface element (413) is selected to access details of the account features. The user interface of FIG. 21 presents the details of the account features currently associated with the consumer account(s) of the user, such as the coverage information, the fees for using the account features, and the terms of use for the respective account features.

The user interface of FIG. 21 presents the account features in a user friendly way. The benefits of the account features are listed with the cost, coverage, and terms and conditions. Thus, the user can learn the account features for reference and/or future use.

In FIG. 21, a user interface element (415) ("Sign Electronic Disclosure") is selectable to request a user interface to sign off disclosure materials electronically (if the user has not already done so); and a user interface element (409) ("Shop Benefits") is selectable to request a further user interface to shop for additional account features.

FIG. 22 illustrates a user interface when the user interface element (409) ("Shop Benefits" illustrated in FIGS. 20 and 31) is selected to shop for additional account features. In FIG. 22, the user interface allows the user to identify up to three account feature packages and request a comparison presentation of the benefits and costs of the selected account feature packaged.

For example, the user may click on the check boxes in the column "Compare" in the section of "Select Package" to select up to a predetermined number (e.g., 3) of packages for comparison. After a package is selected, the title of the package is shown in the "Compare" box (417). After the user selects the packages and clicks on the "Compare" button, a user interface (419) illustrated in FIG. 23 is presented.

In FIG. 23, the benefits of the packages selected for comparison are presented side by side for the selected packages. For example, FIG. 23 illustrates an example in which three packages, "Shop Lite", "Shopping Plus", and "Travel Plus", are selected for comparison. The area (419) is configured to be presented in a pop-up window or a top layer to the show the benefits provided by the selected packages, such as "Warranty Management Service", "Cardholder Inquiry Service", "Emergency Card Replacement", "Emergency Cash Disbursement", "Lost/Stolen Card Reporting", "Reward Program".

FIG. 24 illustrates a user interface to present a list of benefits provided by an account feature package that is about to be ordered by the user. The user may select the user element (421) ("Place Order") to place the order of the account feature package (e.g., "Shopping Plus" identified in FIG. 24).

Figure 25:
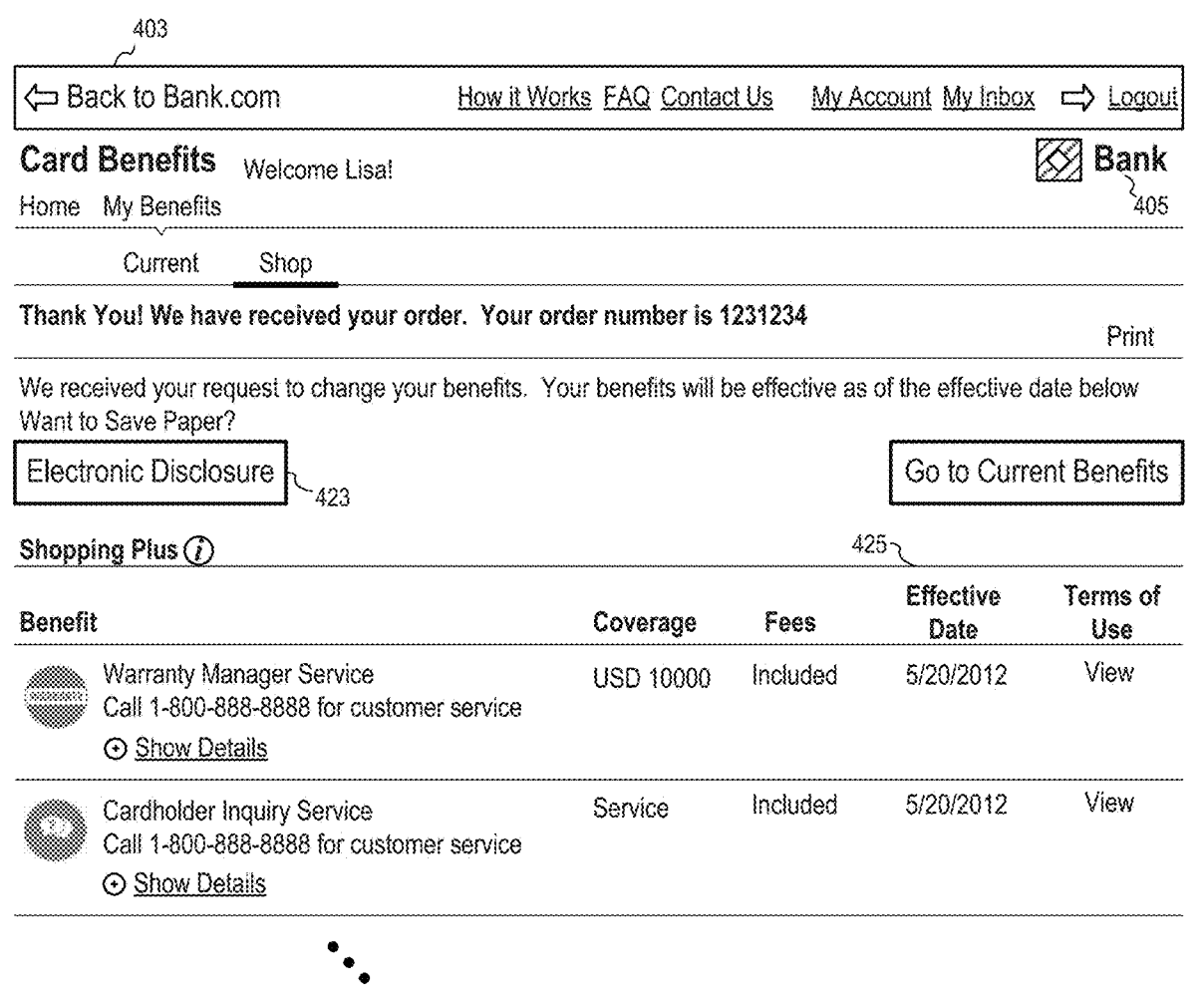

If the user selects the user element (421) ("Place Order") to obtain the account feature package for the consumer account of the user, a user interface illustrated in FIG. 25 is presented.

In FIG. 25, the order of the user is confirmed via a message (e.g., "Thank You! We have received your order. Your order number is 1231234"). The user interface of FIG. 25 includes a facility (423) ("Electronic Disclosure") that allows the user to review the electronic disclosure material of the account feature package that was just ordered. In FIG. 25, a column labeled "Effective Date" shows the effective dates (425) of various benefits afforded by the account feature package (e.g., "Shopping Plus").

FIG. 29 illustrates a user interface (431) to configure the delivery of electronic disclosure material of the ordered account feature package, when the user interface element (423) (e.g., in FIG. 25) is selected. The user interface (431) allows the user to identify an email address to receive the disclosure material electronically. Optionally, the user may reject the electronic disclosure and request a printed copy of the disclosure material.

FIG. 30 illustrates the confirmation interface (433) that confirms the user selection of the option to receive disclosure material electronically.

Figure 28:
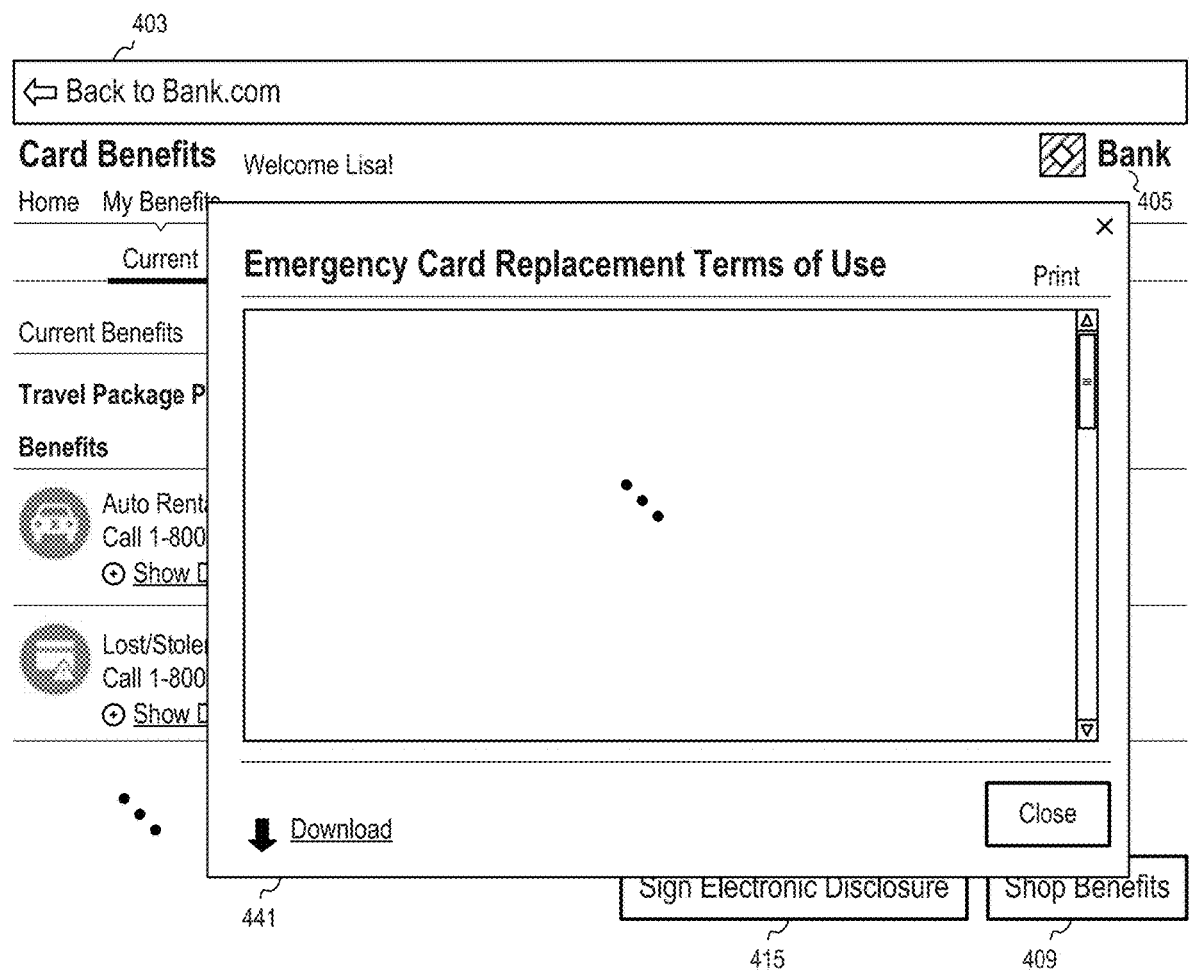

In one embodiment, the portal (143) is configured to present the terms and conditions for the user of the portal (143) and/or the terms of use for the ordered account features, and obtain electronically from the user their consent to the terms and conditions. For example, FIG. 28 illustrates the presentation of terms of use (441) for a specific account feature (e.g., "Emergency Card Replacement") included in the account feature package (e.g., "Travel Package Plus"). For example, when the "view" link in the column "Terms of Use" in FIGS. 21, 24, and 25 is selected the user interface element (441) is presented in a pop-up window or a top layer to present the "Terms of Use" of a corresponding benefit.

Further user interfaces can be used for the presentation and/or the confirmation of the user consent to the terms of use of the portal (143) itself.

In one embodiment, the portal (143) includes a "How it Works" page illustrated in FIG. 29 (e.g., accessible via the link (427)), a "FAQ" page illustrated in FIG. 30 (e.g., accessible via the link (429), which explain the usage of the portal (143) for access account features. The portal (143) may further include a "Contact Us" page (e.g., accessible via the link (435), which presents contact information when the user needs assistance.

FIG. 32 illustrates a "My Account" page (e.g., accessible via the link (437) that includes a user interface configured to allow the user to provide and/or update user interface and/or preferences related to the consumer account, such as the address, phone numbers, email address, electronic disclosure preference, etc.

In one embodiment, the portal (143) includes an electronic message system that allows the delivery of messages to the user via the "My Inbox" page (e.g., accessible via the link (439)), as illustrated in FIG. 33. The user may select a message from a list of messages in the "Inbox" of the user and view the content of the message.

Figure 14:
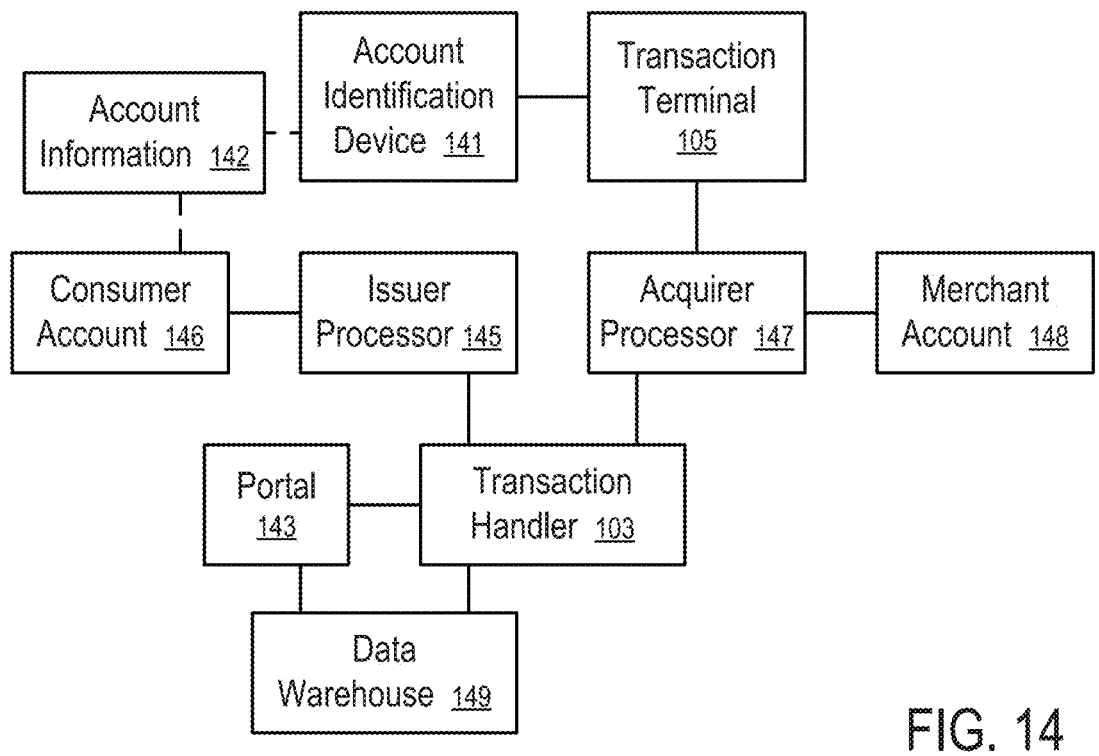
FIG. 14 shows a system to provide transaction based information according to one embodiment.
Figure 34:
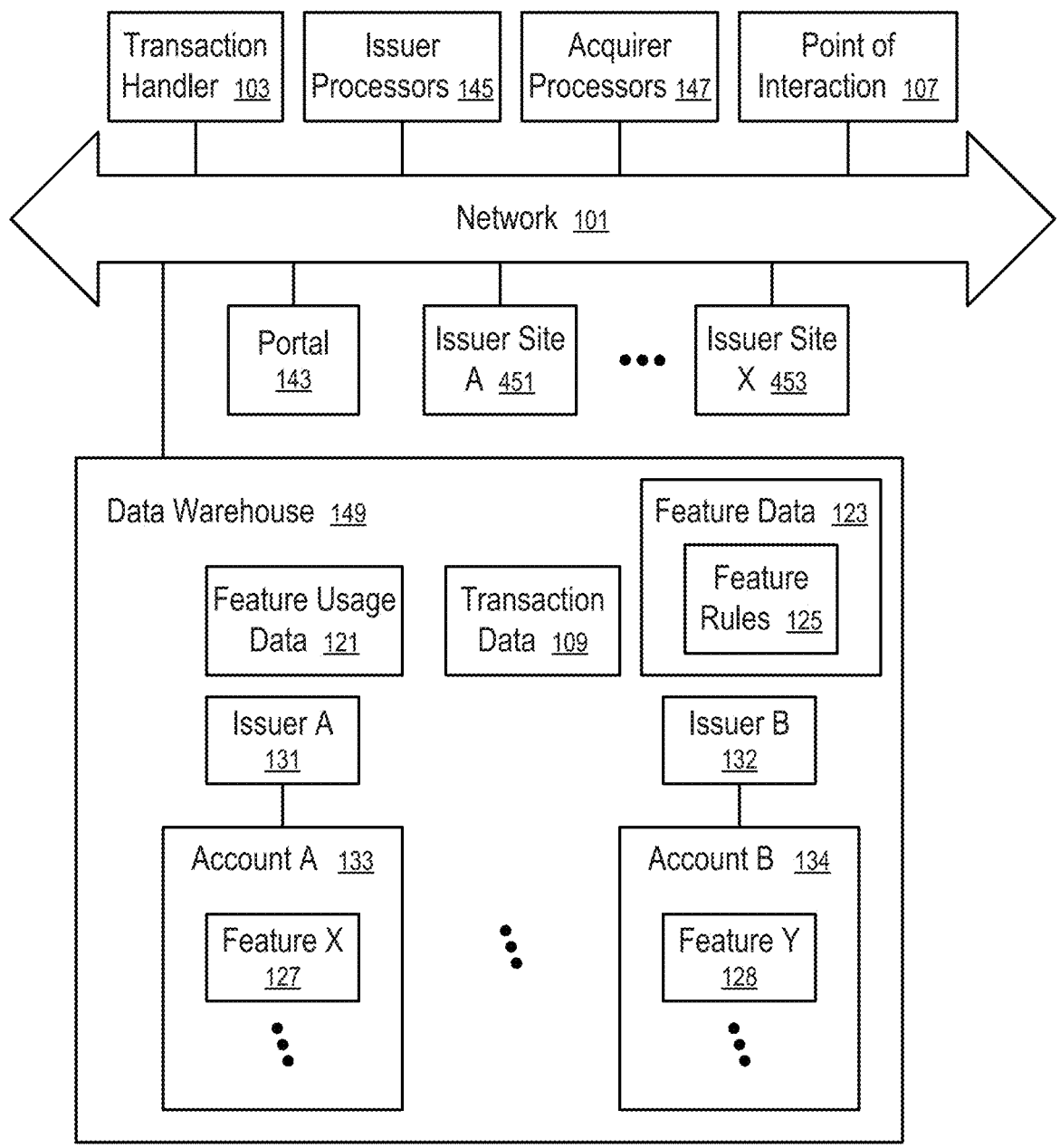
FIG. 34 illustrates a system configured to provide account features according to one embodiment.

FIG. 34 illustrates a system configured to provide account features according to one embodiment. In FIG. 34, a data warehouse (149) is configured to store the transaction data (109) recording the transactions processed by the transaction handler (103) that inter-connects a payment processing network as illustrated in FIG. 14. The payment processing network may include one or more issuer processors (145) and one or more acquirer processors (147).

The data warehouse (149) is further configured to store feature data (123) identifying the feature rules (125), such as specification of benefits, costs, coverage, etc.

The data warehouse (149) is configured to store the account features (e.g., 127, 128) assigned to the accounts (e.g., 133, 134) issued by different issuers (e.g., 131, 132).

The portal (143) is configured to provide an account feature user interface to the point of interaction (107) of a user, after the user is referred to the portal (143) via the issuer sites (e.g., 451, . . . , 453). Examples of a set of web-based user interface for accessing and acquiring account features are illustrated in FIGS. 19-33. The portal (143) is configured to customize the user interfaces for the issuer sites (e.g., 451, . . . , 453), such that the look and feel of the user interface presented to a user of a specific issuer site is consistent with the identification of the issuer site.

Figure 35:
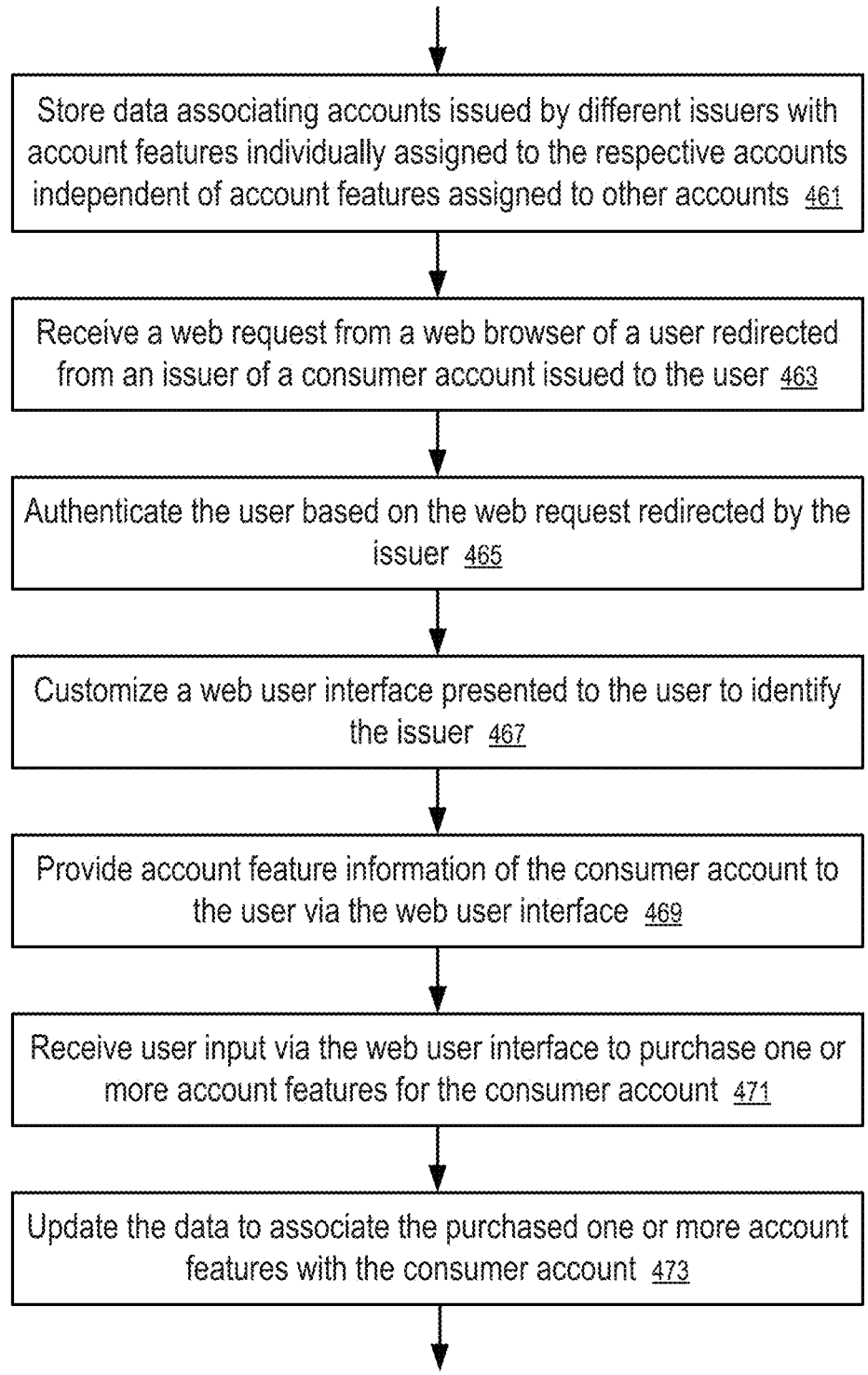
FIG. 35 illustrates a method to provide account features according to one embodiment.

FIG. 35 illustrates a method to provide account features according to one embodiment. For example, the method of FIG. 35 can be implemented in the system of FIG. 34.

In FIG. 35, a computing apparatus is configured to store (461) data associating accounts (133, . . . , 134) issued by different issuers (131, . . . , 132) with account features (127, . . . , 128) individually assigned to the respective accounts independent of account features assigned to other accounts; receive (463) a web request from a web browser of a user redirected from an issuer of a consumer account issued to the user; authenticate (465) the user based on the web request redirected by the issuer; customize (467) a web user interface (e.g., as illustrated in FIGS. 19-33) presented to the user to identify the issuer; provide (469) account feature information of the consumer account to the user via the web user interface; receive (471) user input via the web user interface to purchase one or more account features for the consumer account; and update (473) the data to associate the purchased one or more account features with the consumer account.

For example, a method in one embodiment includes: storing, in the computing apparatus, data associating account features with accounts individually, wherein each account of the accounts is configured to be assigned one or more account features independent of separate accounts; receiving, in the computing apparatus, a web request from a web browser of a user redirected from an issuer of a consumer account issued to the user; and in response to the web request, presenting by the computing apparatus a first user interface to the user via the web browser, wherein the first user interface is customized based on an identity of the issuer in accordance with the web request.

For example, the first user interface (e.g., as illustrated in FIG. 20) concurrently presents at least: an identification (e.g., 405) of the issuer; an identification (e.g., 407) of the user; a summary (e.g., 411) of account features in the consumer account of the user, in accordance with the data; a user interface element (e.g., 413) selectable to request a second user interface to access details of the account features; and a user interface element (e.g., 409) selectable to request a third user interface to shop for account features for the consumer account.

The method may further includes: receiving user selection of a plurality of account feature packages; and presenting a user interface (e.g., 419) showing a comparison of benefits provided by the plurality of account feature packages.

For example, the first user interface can be customized via white label resources including at least one of: logo, label, text area and links.

For example, the first user interface can be further customized via at least one of: html code and style sheet, provided by the issuer.

In one embodiment, the method further includes: electronically presenting a disclosure material of an account feature in the consumer account to the user; and electronically obtaining from the user acceptance of terms of use of the account feature.

In one embodiment, the first user interface further includes a user interface element (e.g., 403) selectable to redirect the user back to a web site of the issuer of the consumer account.

The method may include: authenticating the user based on the web request redirected from the issuer, or authenticating the user independent of the issuer for accessing the first user interface.

In one embodiment, the method further includes: receiving, in the computing apparatus, a second web request from the web browser of the user redirected from a second issuer of a second consumer account issued to the user; and in response to the web request, presenting a second user interface to the user via the web browser, where the second user interface is customized based on an identity of the second issuer in accordance with the second web request.

In one embodiment, the method further includes: receiving input, via the first user interface, to purchase a first account feature for the consumer account; and updating the data to associate the first account feature with the consumer account.

In one embodiment, the computing apparatus includes at least one processor (e.g., 173), and a memory (e.g., 167, 179) storing instructions configured to instruct the at least one processor to perform operations discussed herein.

For example, the computing apparatus may include a data warehouse (149) configured to stored the data and transaction data recording transactions processed by a transaction handler of a payment processing network, where the transactions are made in the consumer accounts issued by different issuers, and transactions in the consumer account of the user are processed by the transaction handler in communication with an issuer processor of the issuer.

For example, the computing apparatus includes a portal configured to present the first user interface via the web browser of the user.

In one embodiment, the portal (143) is configured to via the instructions to: authenticate the user based on the web request redirected from the issuer, receive input, via the first user interface, to purchase a first account feature for the consumer account, and update the data in the date warehouse (149) to associate the first account feature with the consumer account.

In one embodiment, a non-transitory computer-storage medium stores instructions configured to instruct the computing apparatus to perform the operations discussed above.

Figure 17:
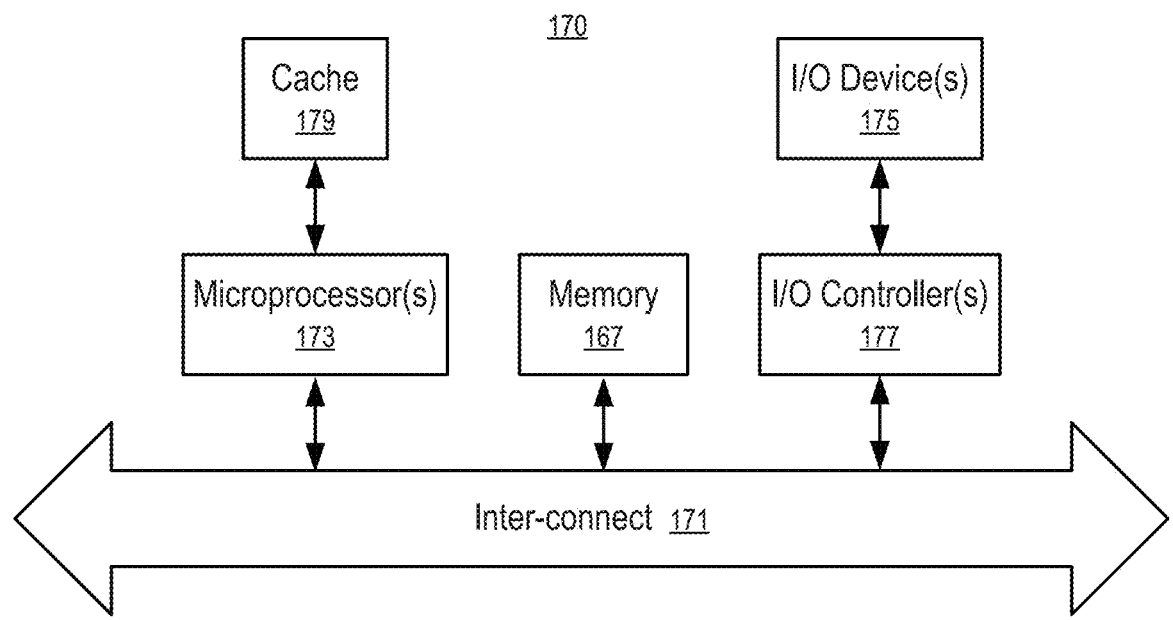
FIG. 17 illustrates a data processing system according to one embodiment.

In one embodiment, the computing apparatus is implemented using one or more data processing systems, each having components illustrated in FIG. 17.

Transaction Handler

FIG. 14 shows a system to provide transaction based information according to one embodiment. In FIG. 14, the transaction handler (103) is coupled between an issuer processor (145) and an acquirer processor (147) to facilitate authorization and settlement of transactions between a consumer account (146) and a merchant account (148). The transaction handler (103) records the transactions in the data warehouse (149). The portal (143) is coupled to the data warehouse (149) to provide information based on the transaction data (109), such as transaction triggers for benefit offers qualified under account features (e.g., 127, 128), loyalty triggers for the notifications of loyalty benefits. The portal (143) may be implemented as a web portal, a telephone gateway, a file/data server, etc.

In one embodiment, the transaction handler (103), the issuer processor (145) and the acquirer processor (147) are operated by different entities. In one embodiment, the transaction handler (103), the issuer processor (145) and the acquirer processor (147) are operated by the same entity.

In one embodiment, the portal (143) provides the account holders, the issuers (e.g., 131, 132), the feature providers (e.g., 118), etc. with the access to the feature related data in the data warehouse (149).

In FIG. 14, the consumer account (146) is under the control of the issuer processor (145). The consumer account (146) may be owned by an individual, or an organization such as a business, a school, etc. The consumer account (146), such as account A (133) or account B (134) in FIG. 1, may be a credit account, a debit account, or a stored value account. The issuer (e.g., 131 or 132) may provide the account holder with an account identification device (141) to identify the consumer account (146) using the account information (142), such as an account number. In some embodiments, the account holder may not be physically issued a card, or the account identification device (141); and the account holder may directly use/present the account information (142) for payment transaction without using the account identification device (1410. The issuer processor (145) is to charge the consumer account (146) to pay for purchases.

In one embodiment, the account identification device (141) is a plastic card having a magnetic strip storing account information (142) identifying the consumer account (146) and/or the issuer processor (145). Alternatively, the account identification device (141) is a smartcard having an integrated circuit chip storing at least the account information (142). In one embodiment, the account identification device (141) includes an RFID device to identify the account information (142). In one embodiment, the account identification device (141) includes a mobile phone having an integrated smartcard.

In one embodiment, the account information (142) is printed or embossed on the account identification device (141). The account information (142) may be printed as a bar code to allow the transaction terminal (105) to read the information via an optical scanner. The account information (142) may be stored in a memory of the account identification device (141) and configured to be read via wireless, contactless communications, such as near field communications via magnetic field coupling, infrared communications, or radio frequency communications. Alternatively, the transaction terminal (105) may require contact with the account identification device (141) to read the account information (142) (e.g., by reading the magnetic strip of a card with a magnetic strip reader).

In one embodiment, the transaction terminal (105) is configured to transmit an authorization request message to the acquirer processor (147). The authorization request includes the account information (142), an amount of payment, and information about the merchant (e.g., an indication of the merchant account (148)). The acquirer processor (147) requests the transaction handler (103) to process the authorization request, based on the account information (142) received in the transaction terminal (105). The transaction handler (103) routes the authorization request to the issuer processor (145) and may process and respond to the authorization request when the issuer processor (145) is not available. The issuer processor (145) determines whether to authorize the transaction based at least in part on a balance of the consumer account (146).

In one embodiment, the transaction handler (103), the issuer processor (145), and the acquirer processor (147) may each include a subsystem to identify the risk in the transaction and may reject the transaction based on the risk assessment.

In one embodiment, the account identification device (141) includes security features to prevent unauthorized uses of the consumer account (146), such as a logo to show the authenticity of the account identification device (141), encryption to protect the account information (142), etc.

In one embodiment, the transaction terminal (105) is configured to interact with the account identification device (141) to obtain the account information (142) that identifies the consumer account (146) and/or the issuer processor (145). The transaction terminal (105) communicates with the acquirer processor (147) that controls the merchant account (148) of a merchant. The transaction terminal (105) may communicate with the acquirer processor (147) via a data communication connection, such as a telephone connection, an Internet connection, etc. The acquirer processor (147) is to collect payments into the merchant account (148) on behalf of the merchant.

In one embodiment, the transaction terminal (105) is a POS terminal at a traditional, offline, "brick and mortar" retail store. In another embodiment, the transaction terminal (105) is an online server that receives account information (142) of the consumer account (146) from the account holder through a web connection. In one embodiment, the account holder may provide account information (142) through a telephone call, via verbal communications with a representative of the merchant; and the representative enters the account information (142) into the transaction terminal (105) to initiate the transaction.

In one embodiment, the account information (142) can be entered directly into the transaction terminal (105) to make payment from the consumer account (146), without having to physically present the account identification device (141). When a transaction is initiated without physically presenting an account identification device (141), the transaction is classified as a "card-not-present" (CNP) transaction.

In one embodiment, the issuer processor (145) may control more than one consumer account (146); the acquirer processor (147) may control more than one merchant account (148); and the transaction handler (103) is connected between a plurality of issuer processors (e.g., 145) and a plurality of acquirer processors (e.g., 147). An entity (e.g., bank) may operate both an issuer processor (145) and an acquirer processor (147).

In one embodiment, the transaction handler (103), the issuer processor (145), the acquirer processor (147), the transaction terminal (105), the portal (143), and other devices and/or services accessing the portal (143) are connected via a network (101), which may include one or more communications networks, such as local area networks, cellular telecommunications networks, wireless wide area networks, wireless local area networks, an intranet, and Internet. In one embodiment, dedicated communication channels are used between the transaction handler (103) and the issuer processor (145), between the transaction handler (103) and the acquirer processor (147), and/or between the portal (143) and the transaction handler (103).

In one embodiment, the transaction handler (103) uses the data warehouse (149) to store the records about the transactions, such as the transaction data (109). In one embodiment, the transaction handler (103) includes a powerful computer, or cluster of computers functioning as a unit, controlled by instructions stored on a computer readable medium.

In one embodiment, the transaction handler (103) is configured to support and deliver authorization services, exception file services, and clearing and settlement services. In one embodiment, the transaction handler (103) has a subsystem to process authorization requests and another subsystem to perform clearing and settlement services.

In one embodiment, the transaction handler (103) is configured to process different types of transactions, such as credit card transactions, debit card transactions, prepaid card transactions, and other types of commercial transactions.

In one embodiment, the transaction handler (103) facilitates the communications between the issuer processor (145) and the acquirer processor (147).

In one embodiment, the transaction terminal (105) is configured to submit the authorized transactions to the acquirer processor (147) for settlement. The amount for the settlement may be different from the amount specified in the authorization request. The transaction handler (103) is coupled between the issuer processor (145) and the acquirer processor (147) to facilitate the clearing and settling of the transaction. Clearing includes the exchange of financial information between the issuer processor (145) and the acquirer processor (147); and settlement includes the exchange of funds.

In one embodiment, the issuer processor (145) is to provide funds to make payments on behalf of the consumer account (146). The acquirer processor (147) is to receive the funds on behalf of the merchant account (148). The issuer processor (145) and the acquirer processor (147) communicate with the transaction handler (103) to coordinate the transfer of funds for the transaction. In one embodiment, the funds are transferred electronically.

In one embodiment, the transaction terminal (105) may submit a transaction directly for settlement, without having to separately submit an authorization request.

In one embodiment, the portal (143) provides a user interface to allow the account holder to organize the transactions in one or more consumer accounts (146) of the user with one or more issuers. The account holder may organize the transactions using information and/or categories identified in the transaction records, such as merchant category, transaction date, amount, etc. Examples and techniques in one embodiment are provided in U.S. patent application Ser. No. 11/378,215, filed Mar. 16, 2006, assigned Pub. No. 2007/0055597, and entitled "Method and System for Manipulating Purchase Information," the disclosure of which is hereby incorporated herein by reference.

In one embodiment, the portal (143) provides transaction based statistics, such as indicators for retail spending monitoring, indicators for merchant benchmarking, industry/market segmentation, indicators of spending patterns, etc. Further examples can be found in U.S. patent application Ser. No. 12/191,796, filed Aug. 14, 2008, assigned Pub. No. 2009/0048884, and entitled "Merchant Benchmarking Tool," the disclosure of which application are hereby incorporated herein by reference.

Transaction Terminal

Figure 15:
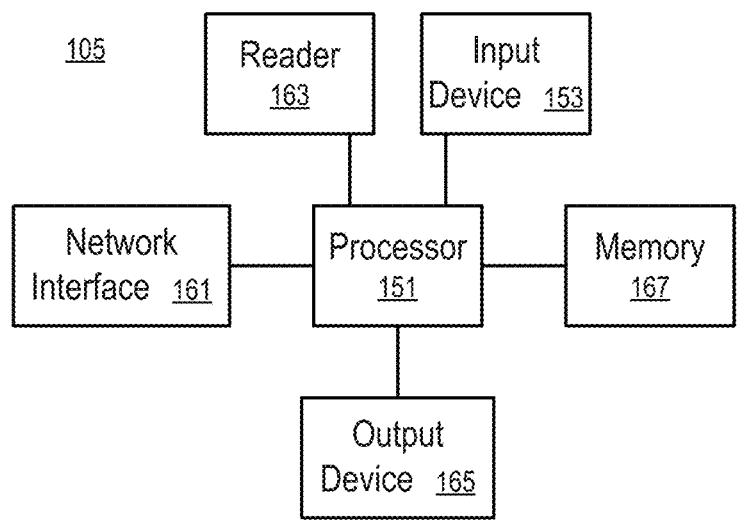
FIG. 15 illustrates a transaction terminal according to one embodiment.

FIG. 15 illustrates a transaction terminal according to one embodiment. In FIG. 15, the transaction terminal (105) is configured to interact with an account identification device (141) to obtain account information (142) about the consumer account (146).

In one embodiment, the transaction terminal (105) includes a memory (167) coupled to the processor (151), which controls the operations of a reader (163), an input device (153), an output device (165) and a network interface (161). The memory (167) may store instructions for the processor (151) and/or data, such as an identification that is associated with the merchant account (148).

In one embodiment, the reader (163) includes a magnetic strip reader. In another embodiment, the reader (163) includes a contactless reader, such as a radio frequency identification (RFID) reader, a near field communications (NFC) device configured to read data via magnetic field coupling (in accordance with ISO standard 14443/NFC), a Bluetooth transceiver, a WiFi transceiver, an infrared transceiver, a laser scanner, etc.

In one embodiment, the input device (153) includes key buttons that can be used to enter the account information (142) directly into the transaction terminal (105) without the physical presence of the account identification device (141). The input device (153) can be configured to provide further information to initiate a transaction, such as a personal identification number (PIN), password, zip code, etc. that may be used to access the account identification device (141), or in combination with the account information (142) obtained from the account identification device (141).

In one embodiment, the output device (165) may include a display, a speaker, and/or a printer to present information, such as the result of an authorization request, a receipt for the transaction, an advertisement, etc.

In one embodiment, the network interface (161) is configured to communicate with the acquirer processor (147) via a telephone connection, an Internet connection, or a dedicated data communication channel.

In one embodiment, the instructions stored in the memory (167) are configured at least to cause the transaction terminal (105) to send an authorization request message to the acquirer processor (147) to initiate a transaction. The transaction terminal (105) may or may not send a separate request for the clearing and settling of the transaction. The instructions stored in the memory (167) are also configured to cause the transaction terminal (105) to perform other types of functions discussed in this description.

In one embodiment, a transaction terminal (105) may have fewer components than those illustrated in FIG. 15. For example, in one embodiment, the transaction terminal (105) is configured for "card-not-present" transactions; and the transaction terminal (105) does not have a reader (163).

In one embodiment, a transaction terminal (105) may have more components than those illustrated in FIG. 15. For example, in one embodiment, the transaction terminal (105) is an ATM machine, which includes components to dispense cash under certain conditions.

Account Identification Device

Figure 16:
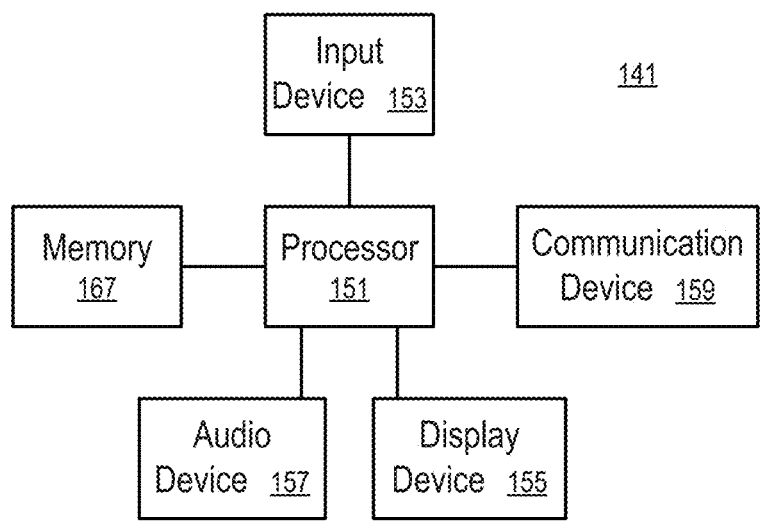
FIG. 16 illustrates an account identifying device according to one embodiment.

FIG. 16 illustrates an account identifying device according to one embodiment. In FIG. 16, the account identification device (141) is configured to carry account information (142) that identifies the consumer account (146).

In one embodiment, the account identification device (141) includes a memory (167) coupled to the processor (151), which controls the operations of a communication device (159), an input device (153), an audio device (157) and a display device (155). The memory (167) may store instructions for the processor (151) and/or data, such as the account information (142) associated with the consumer account (146).

In one embodiment, the account information (142) includes an identifier identifying the issuer (and thus the issuer processor (145)) among a plurality of issuers, and an identifier identifying the consumer account among a plurality of consumer accounts controlled by the issuer processor (145). The account information (142) may include an expiration date of the account identification device (141), the name of the consumer holding the consumer account (146), and/or an identifier identifying the account identification device (141) among a plurality of account identification devices associated with the consumer account (146).

In one embodiment, the account information (142) may further include a loyalty program account number, accumulated rewards of the consumer in the loyalty program, an address of the consumer, a balance of the consumer account (146), transit information (e.g., a subway or train pass), access information (e.g., access badges), and/or consumer information (e.g., name, date of birth), etc.

In one embodiment, the memory includes a nonvolatile memory, such as magnetic strip, a memory chip, a flash memory, a Read Only Memory (ROM), etc. to store the account information (142).

In one embodiment, the information stored in the memory (167) of the account identification device (141) may also be in the form of data tracks that are traditionally associated with credits cards. Such tracks include Track 1 and Track 2. Track 1 ("International Air Transport Association") stores more information than Track 2, and contains the account holder's name as well as the account number and other discretionary data. Track 1 is sometimes used by airlines when securing reservations with a credit card. Track 2 ("American Banking Association") is currently most commonly used and is read by ATMs and credit card checkers. The ABA (American Banking Association) designed the specifications of Track 1 and banks abide by it. It contains the account holder's account number, encrypted PIN, and other discretionary data.

In one embodiment, the communication device (159) includes a semiconductor chip to implement a transceiver for communication with the reader (163) and an antenna to provide and/or receive wireless signals.

In one embodiment, the communication device (159) is configured to communicate with the reader (163). The communication device (159) may include a transmitter to transmit the account information (142) via wireless transmissions, such as radio frequency signals, magnetic coupling, or infrared, Bluetooth or WiFi signals, etc.

In one embodiment, the account identification device (141) is in the form of a mobile phone, personal digital assistant (PDA), etc. The input device (153) can be used to provide input to the processor (151) to control the operation of the account identification device (141); and the audio device (157) and the display device (155) may present status information and/or other information, such as advertisements or offers. The account identification device (141) may include further components that are not shown in FIG. 16, such as a cellular communications subsystem.

In one embodiment, the communication device (159) may access the account information (142) stored on the memory (167) without going through the processor (151).

In one embodiment, the account identification device (141) has fewer components than those illustrated in FIG. 16. For example, an account identification device (141) does not have the input device (153), the audio device (157) and the display device (155) in one embodiment; and in another embodiment, an account identification device (141) does not have components (151-159).

For example, in one embodiment, an account identification device (141) is in the form of a debit card, a credit card, a smartcard, or a consumer device that has optional features such as magnetic strips, or smartcards.

An example of an account identification device (141) is a magnetic strip attached to a plastic substrate in the form of a card. The magnetic strip is used as the memory (167) of the account identification device (141) to provide the account information (142). Consumer information, such as account number, expiration date, and consumer name may be printed or embossed on the card. A semiconductor chip implementing the memory (167) and the communication device (159) may also be embedded in the plastic card to provide account information (142) in one embodiment. In one embodiment, the account identification device (141) has the semiconductor chip but not the magnetic strip.

In one embodiment, the account identification device (141) is integrated with a security device, such as an access card, a radio frequency identification (RFID) tag, a security card, a transponder, etc.

In one embodiment, the account identification device (141) is a handheld and compact device. In one embodiment, the account identification device (141) has a size suitable to be placed in a wallet or pocket of the consumer.

Some examples of an account identification device (141) include a credit card, a debit card, a stored value device, a payment card, a gift card, a smartcard, a smart media card, a payroll card, a health care card, a wrist band, a keychain device, a supermarket discount card, a transponder, and a machine readable medium containing account information (142).

Point of Interaction

In one embodiment, the point of interaction (107) is to provide an offer to the account holder, and/or to provide a user interface to customize, use, and access account features (e.g., 127 and 128).

In one embodiment, the point of interaction (107) is to facilitate a marketing interaction which may include an announcement and/or an offer of a benefit, such as a discount, incentive, reward, coupon, gift, cash back, or opportunity (e.g., special ticket/admission).

In one embodiment, the marketing interaction is provided as a notification of a benefit of an account feature (e.g., 127 or 128). The benefit may be triggered by a qualifying transaction, or other events, such as an anniversary date, the current location of the account holder, etc.

In one embodiment, the marketing interaction is provided as a notification of the eligibility for an account feature (e.g., 127 or 128). The eligibility may be triggered by a qualifying transaction, an aggregated spending amount in a period of time, an aggregated spending amount in a category, or other events, such as an anniversary date, the current location of the account holder, etc.

In one embodiment, the notification may include an offer of a product or service, an announcement of a product or service, or a presentation of a brand of products or services, or a notice of events, facts, opinions, etc. The notification can be presented in text, graphics, audio, video, or animation, and as printed matter, web content, interactive media, etc. In one embodiment, the notification is provided in a form of an advertisement.

In one embodiment, the notification is presented in response to the presence of an account identification device (141), or in response to an account identification device (141) being used to make a financial transaction, or in response to other user activities, such as browsing a web page, submitting a search request, communicating online, entering a wireless communication zone, etc. In one embodiment, the presentation of notification may be not a result of a user action.

In one embodiment, the point of interaction (107) can be one of various endpoints of the transaction network, such as point of sale (POS) terminals, automated teller machines (ATMs), electronic kiosks (or computer kiosks or interactive kiosks), self-assist checkout terminals, vending machines, gas pumps, websites of banks (e.g., issuer banks or acquirer banks of credit cards), bank statements (e.g., credit card statements), websites of the transaction handler (103), websites of merchants, checkout websites or web pages for online purchases, etc.

In one embodiment, the point of interaction (107) may be the same as the transaction terminal (105), such as a point of sale (POS) terminal, an automated teller machine (ATM), a mobile phone, a computer of the user for an online transaction, etc. In one embodiment, the point of interaction (107) may be co-located with the transaction terminal (105), or produced by the transaction terminal (e.g., a receipt produced by the transaction terminal (105)). In one embodiment, the point of interaction (107) may be separate from and not co-located with the transaction terminal (105), such as a mobile phone, a personal digital assistant, a personal computer of the user, a voice mail box of the user, an email inbox of the user, a digital signage, etc.

For example, the advertisements can be presented on a portion of media for a transaction with the customer, which portion might otherwise be unused and thus referred to as a "white space" herein. A white space can be on a printed matter (e.g., a receipt printed for the transaction, or a printed credit card statement), on a video display (e.g., a display monitor of a POS terminal for a retail transaction, an ATM for cash withdrawal or money transfer, a personal computer of the customer for online purchases), or on an audio channel (e.g., an interactive voice response (IVR) system for a transaction over a telephonic device).

In one embodiment, the white space is part of a media channel available to present a message from the transaction handler (103) in connection with the processing of a transaction of the account holder. In one embodiment, the white space is in a media channel that is used to report information about a transaction of the account holder, such as an authorization status, a confirmation message, a verification message, a user interface to verify a password for the online use of the account information (142), a monthly statement, an alert or a report, or a web page provided by the portal (143) to access a loyalty program associated with the consumer account (146) or a registration program.

In other embodiments, the advertisements can also be presented via other media channels which may not involve a transaction processed by the transaction handler (103). For example, the advertisements can be presented on publications or announcements (e.g., newspapers, magazines, books, directories, radio broadcasts, television, digital signage, etc., which may be in an electronic form, or in a printed or painted form). The advertisements may be presented on paper, on websites, on billboards, or on audio portals.

In one embodiment, the transaction handler (103) purchases the rights to use the media channels from the owner or operators of the media channels and uses the media channels as advertisement spaces. For example, white spaces at a point of interaction (e.g., 107) with customers for transactions processed by the transaction handler (103) can be used to deliver advertisements relevant to the customers conducting the transactions; and the advertisement can be selected based at least in part on the intelligence information derived from the accumulated transaction data (109) and/or the context at the point of interaction (107) and/or the transaction terminal (105).

In general, a point of interaction (e.g., 107) may or may not be capable of receiving inputs from the customers, and may or may not co-located with a transaction terminal (e.g., 105) that initiates the transactions. The white spaces for presenting the advertisement on the point of interaction (107) may be on a portion of a geographical display space (e.g., on a screen), or on a temporal space (e.g., in an audio stream).

In one embodiment, the point of interaction (107) may be used to primarily to access services not provided by the transaction handler (103), such as services provided by a search engine, a social networking website, an online marketplace, a blog, a news site, a television program provider, a radio station, a satellite, a publisher, etc.

In one embodiment, a consumer device is used as the point of interaction (107), which may be a non-portable consumer device or a portable computing device. The consumer device is to provide media content to the account holder and may receive input from the account holder.

Examples of non-portable consumer devices include a computer terminal, a television set, a personal computer, a set-top box, or the like. Examples of portable consumer devices include a portable computer, a cellular phone, a personal digital assistant (PDA), a pager, a security card, a wireless terminal, or the like. The consumer device may be implemented as a data processing system as illustrated in FIG. 17, with more or fewer components.

In one embodiment, the consumer device includes an account identification device (141). For example, a smart card used as an account identification device (141) is integrated with a mobile phone, or a personal digital assistant (PDA).

In one embodiment, the point of interaction (107) is integrated with a transaction terminal (105). For example, a self-service checkout terminal includes a touch pad to interact with the account holder; and an ATM machine includes a user interface subsystem to interact with the account holder.

Hardware

In one embodiment, a computing apparatus is configured to include some of the modules or components illustrated in FIGS. 1, 2 and 14, such as the transaction handler (103), the portal (143), the issuer processor (145), the acquirer processor (147), the feature offer engine (113), the notification engine (117), the procurement engine (119), and their associated storage devices, such as the data warehouse (149).

In one embodiment, at least some of the modules or components illustrated in FIGS. 1, 2 and 14, such as the transaction handler (103), the transaction terminal (105), the point of interaction (107), the portal (143), the issuer processor (145), the acquirer processor (147), the feature offer engine (113), the notification engine (117), the procurement engine (119), and the account identification device (141), can be implemented as a computer system, such as a data processing system illustrated in FIG. 17, with more or fewer components. Some of the modules may share hardware or be combined on a computer system. In one embodiment, a network of computers can be used to implement one or more of the modules.

Further, the data illustrated in FIG. 1, such as transaction data (109), feature data (123), feature rules (125), and feature usage data (121) can be stored in storage devices of one or more computers accessible to the corresponding modules or components illustrated in FIG. 1. For example, the transaction data (109) can be stored in the data warehouse (149) that can be implemented as a data processing system illustrated in FIG. 17, with more or fewer components.

In one embodiment, the transaction handler (103) is a payment processing system, or a payment card processor, such as a card processor for credit cards, debit cards, etc.

FIG. 17 illustrates a data processing system according to one embodiment. While FIG. 17 illustrates various components of a computer system, it is not intended to represent any particular architecture or manner of interconnecting the components. One embodiment may use other systems that have fewer or more components than those shown in FIG. 17.

In FIG. 17, the data processing system (170) includes an inter-connect (171) (e.g., bus and system core logic), which interconnects a microprocessor(s) (173) and memory (167). The microprocessor (173) is coupled to cache memory (179) in the example of FIG. 17.

In one embodiment, the inter-connect (171) interconnects the microprocessor(s) (173) and the memory (167) together and also interconnects them to input/output (I/O) device(s) (175) via I/O controller(s) (177). I/O devices (175) may include a display device and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (167) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Other Aspects

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer-implemented method for generating a customized webpage, comprising:
   storing, with at least one processor, account data associating at least one account feature with a user account;
   receiving, with at least one processor, a web request from a web browser of a user redirected from an issuer website of an issuer, the issuer being an issuer of the user account issued to the user;
   automatically identifying, with at least one processor and based on the web request, the issuer of the issuer website;
   in response to identifying the issuer, automatically retrieving, with at least one processor, a white label resource associated with the issuer; and
   using the retrieved white label resource associated with the issuer, automatically generating and transmitting to the web browser of the user, with at least one processor, a customized webpage that displays a first user interface, wherein the customized webpage is separate from the website of the issuer, wherein the first user interface is customized by displaying data associated with the at least one account feature associated with the user account comprising an identification of the user and the white label resource associated with the issuer.

2. The computer-implemented method of claim 1, wherein the white label resource associated with the issuer comprises at least one of the following: a logo, a label, a text area, a link, or any combination thereof, associated with the issuer.

3. The computer-implemented method of claim 1, wherein the first user interface is further customized based on at least one of the following: html code, a style sheet, or any combination thereof, provided by the issuer.

4. The computer-implemented method of claim 1, wherein the first user interface further comprises a user interface element selectable to redirect the user back to a website of the issuer of the user account.

5. The computer-implemented method of claim 1, further comprising:
   authenticating, with at least one processor, the user based on the web request redirected from the issuer.

6. The computer-implemented method of claim 1, further comprising:
   separately authenticating the user, with at least one processor, independent of the issuer website.

7. The method of claim 1, further comprising:
   receiving, with at least one processor, a second web request from the web browser of the user redirected from a second issuer of a second user account issued to the user; and
   in response to the web request, displaying a second user interface to the user via the web browser, wherein the second user interface is customized based on an identity of the second issuer associated with the second web request.

8. A system for generating a customized webpage, comprising at least one processor and a memory storing instructions configured to instruct the at least one processor to:
store account data associating at least one account feature with a user account;
receive a web request from a web browser of a user redirected from an issuer website of an issuer, the issuer being an issuer of the user account issued to the user;
automatically identify, based on the web request, the issuer of the issuer website;
in response to identifying the issuer, automatically retrieve a white label resource associated with the issuer; and
using the retrieved white label resource associated with the issuer, automatically generate and transmit to the web browser of the user a customized webpage that displays a first user interface, wherein the customized webpage is separate from the website of the issuer, wherein the first user interface is customized by displaying data associated with the at least one account feature associated with the user account comprising an identification of the user and the white label resource associated with the issuer.

9. The system of claim 8, wherein the white label resource associated with the issuer comprises at least one of the following: a logo, a label, a text area, a link, or any combination thereof, associated with the issuer.

10. The system of claim 8, wherein the first user interface is further customized based on at least one of the following: html code, a style sheet, or any combination thereof, provided by the issuer.

11. The system of claim 8, wherein the first user interface further comprises a user interface element selectable to redirect the user back to a website of the issuer of the user account.

12. The system of claim 8, wherein the at least one processor is further programmed or configured to:
authenticate the user based on the web request redirected from the issuer.

13. The system of claim 8, wherein the at least one processor is further programmed or configured to:
separately authenticate the user independent of the issuer website.

14. The system of claim 8, wherein the at least one processor is further programmed or configured to:
receive a second web request from the web browser of the user redirected from a second issuer of a second user account issued to the user; and
in response to the web request, display a second user interface to the user via the web browser, wherein the second user interface is customized based on an identity of the second issuer in accordance with the second web request.

15. A computer program product for generating a customized webpage, the computer program product comprising at least one non-transitory computer-readable medium including one or more instructions that, when executed by at least one processor, cause the at least one processor to:
store account data associating at least one account feature with a user account;
receive a web request from a web browser of a user redirected from an issuer website of an issuer, the issuer being an issuer of the user account issued to the user;
automatically identify, based on the web request, the issuer of the issuer website;
in response to identifying the issuer, automatically retrieve a white label resource associated with the issuer; and
using the retrieved white label resource associated with the issuer, automatically generate and transmit to the web browser of the user a customized webpage that displays a first user interface, wherein the customized webpage is separate from the website of the issuer, wherein the first user interface is customized by displaying data associated with the at least one account feature associated with the user account comprising an identification of the user and the white label resource associated with the issuer.

* * * * *